(12) United States Patent
Geng et al.

(10) Patent No.: US 12,287,732 B2
(45) Date of Patent: Apr. 29, 2025

(54) METHOD AND DEVICE FOR STORING DATA

(71) Applicant: SAMSUNG ELECTRONICS CO., LTD., Suwon-si (KR)

(72) Inventors: Lei Geng, Shaanxi Province (CN); Yanlong Yang, Shaanxi Province (CN); Yuqi Zhang, Shaanxi Province (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 22 days.

(21) Appl. No.: 18/223,900

(22) Filed: Jul. 19, 2023

(65) Prior Publication Data
US 2024/0037027 A1    Feb. 1, 2024

(30) Foreign Application Priority Data
Jul. 27, 2022 (CN) .......................... 202210893219.3

(51) Int. Cl.
*G06F 12/00* (2006.01)
*G06F 12/02* (2006.01)

(52) U.S. Cl.
CPC ...... *G06F 12/0253* (2013.01); *G06F 12/0246* (2013.01)

(58) Field of Classification Search
CPC ............. G06F 12/0253; G06F 12/0246; G06F 2212/1016; G06F 2212/1044; G06F 2212/7205
See application file for complete search history.

(56) References Cited

U.S. PATENT DOCUMENTS

| 10,909,074 | B2 | 2/2021 | Mainali et al. | |
| 2013/0275391 | A1* | 10/2013 | Batwara | G06F 16/125 |
| | | | | 707/689 |
| 2017/0315730 | A1* | 11/2017 | Hashimoto | G06F 3/0643 |
| 2018/0067863 | A1* | 3/2018 | Ki | G06F 12/0888 |
| 2019/0332329 | A1 | 10/2019 | Qui et al. | |
| 2020/0225882 | A1 | 7/2020 | Li | |
| 2020/0372005 | A1 | 11/2020 | Apte et al. | |
| 2021/0181992 | A1 | 6/2021 | Wang et al. | |
| 2021/0240612 | A1* | 8/2021 | Muthiah | G06F 12/0253 |
| 2021/0390045 | A1 | 12/2021 | Merchant et al. | |

FOREIGN PATENT DOCUMENTS

| CN | 110007860 A | 7/2019 |
| CN | 111026329 A | 4/2020 |
| CN | 112286460 A | 1/2021 |

\* cited by examiner

*Primary Examiner* — John A Lane
(74) *Attorney, Agent, or Firm* — Sughrue Mion, PLLC

(57) ABSTRACT

A method and device for storing data are provided. The method includes: selecting at least one block from a plurality of blocks in a storage device as a evicting block or a target block based on an expected expiration time of each of the plurality of blocks in response to a request for garbage collection, wherein the expected expiration time of each block is obtained based on an expected expiration time of valid data of each block; and performing garbage collection based on the selected at least one block.

18 Claims, 14 Drawing Sheets

METHOD AND DEVICE FOR STORING DATA

CROSS-REFERENCE TO RELATED APPLICATIONS

This application is based on and claims priority under 35 U.S.C. § 119 to Chinese Patent Application No. 202210893219.3 filed on Jul. 27, 2022, in the China National Intellectual Property Administration, the disclosure of which is incorporated by reference herein in its entirety.

BACKGROUND

1. Field

The disclosure relates to the storage field, and more specifically, to a method and device for storing data.

2. Description of Related Art

Recently, storage devices (such as Solid State Drive (SSD), Non-Volatile Memory Express (NVMe), Embedded Multi Media Card (eMMC), Universal flash memory (UFS) etc.) have been widely used. In the process of using the storage device, the garbage collection (GC) performance of the storage device is an indicator that needs to be especially considered.

Garbage collection generally refers to an operation of storing valid data in a evicting block in a storage device to a target block and erasing the evicting block. Generally, the bandwidth of the storage device is limited, so the performance of the storage device will be affected when garbage collection is performed.

SUMMARY

One or more aspects of the disclosure provide a method and a device for storing data.

According to an aspect of the disclosure, there is provided a method of storing data, the method includes: selecting, based on a request for garbage collection, at least one first block from a plurality of blocks in a storage as a evicting block or a target block based on an expected expiration time of each of the plurality of blocks, the expected expiration time of each of the plurality of blocks being obtained based on an expected expiration time of valid data of each of the plurality of blocks; and performing garbage collection based on the selected at least one first block.

According to another aspect of the disclosure, there is provided a device for storing data, the device includes: a storage divided into a plurality of blocks for storing data; and a processor configured to: select, based on a request for garbage collection, at least one first block from a plurality of blocks in a storage as a evicting block or a target block based on an expected expiration time of each of the plurality of blocks, the expected expiration time of each of the plurality of blocks being obtained based on an expected expiration time of valid data of each of the plurality of blocks; and perform garbage collection based on the selected at least one first block.

According to another aspect of the disclosure, there is provided a computer-readable storage medium storing a computer program, which, when executed by a processor, implements the method of storing data.

According to another aspect of the disclosure, there is provided an electronic system, the electronic system includes: a memory storing one or more instructions; and a storage device divided into a plurality of blocks for storing data; and a processor configured to execute the one or more instructions to: select, based on a request for garbage collection, at least one first block from the plurality of blocks in the storage device as a evicting block or a target block based on an expected expiration time of each of the plurality of blocks, the expected expiration time of each of the plurality of blocks being obtained based on an expected expiration time of valid data of each of the plurality of blocks; and perform garbage collection based on the selected at least one first block.

According to another aspect of the disclosure, there is provided a host storage system, the host storage system includes: a host; and a storage device divided into a plurality of blocks for storing data, wherein the host includes: a memory storing one or more instructions; and a processor configured to execute the one or more instructions to: select, based on a request for garbage collection, at least one first block from the plurality of blocks in the storage device as a evicting block or a target block based on an expected expiration time of each of the plurality of blocks, the expected expiration time of each of the plurality of blocks being obtained based on an expected expiration time of valid data of each of the plurality of blocks; and perform garbage collection based on the selected at least one first block.

According to another aspect of the disclosure, there is provided a storage system, the storage system includes: a storage device divided into a plurality of blocks for storing data; and a memory controller configured to control the storage device to store the data, the memory controller including: a memory storing one or more instructions; and a processor configured to execute the one or more instructions to: select, based on a request for garbage collection, at least one first block from the plurality of blocks in the storage device as a evicting block or a target block based on an expected expiration time of each of the plurality of blocks, the expected expiration time of each of the plurality of blocks being obtained based on an expected expiration time of valid data of each of the plurality of blocks; and perform garbage collection based on the selected at least one first block.

According to another aspect of the disclosure, there is provided an universal flash memory system, the universal flash memory system includes: an universal flash memory host; an universal interface; and an universal flash memory device configured to communicate with the universal flash memory host via the universal interface, the universal flash memory device being divided into a plurality of blocks for storing data, wherein the universal flash memory host includes: a memory storing one or more instructions; and a processor configured to execute the one or more instructions to: select, based on a request for garbage collection, at least one first block from the plurality of blocks in the storage device as a evicting block or a target block based on an expected expiration time of each of the plurality of blocks, the expected expiration time of each of the plurality of blocks being obtained based on an expected expiration time of valid data of each of the plurality of blocks; and perform garbage collection based on the selected at least one first block.

According to another aspect of the disclosure, there is provided a storage system, the storage system includes: a memory device divided into a plurality of blocks for storing data; and a memory controller communicating with the memory device through a channel and configured to control the memory device to store the data, wherein the memory controller includes: a memory storing one or more instructions; and a processor configured to execute the one or more instructions to: select, based on a request for garbage collection, at least one first block from the plurality of blocks in the memory device as a evicting block or a target block based on an expected expiration time of each of the plurality of blocks, the expected expiration time of each of the plurality of blocks being obtained based on an expected expiration time of valid data of each of the plurality of blocks; and perform garbage collection based on the selected at least one first block.

According to another aspect of the disclosure, there is provided a data center, the data center includes: an application server; and a storage server configured to communicate with the application server over a network, the storage server divided into a plurality of blocks for storing data, wherein the application server includes: a memory storing one or more instructions; and a processor configured to execute the one or more instructions to: select, based on a request for garbage collection, at least one first block from the plurality of blocks in the storage server as a evicting block or a target block based on an expected expiration time of each of the plurality of blocks, the expected expiration time of each of the plurality of blocks being obtained based on an expected expiration time of valid data of each of the plurality of blocks; and perform garbage collection based on the selected at least one first block.

BRIEF DESCRIPTION OF THE DRAWINGS

The above and other objects and features of the disclosure will become clearer by the following description in conjunction with the accompanying drawings showing an example, wherein.

DETAILED DESCRIPTION

Figure 1:
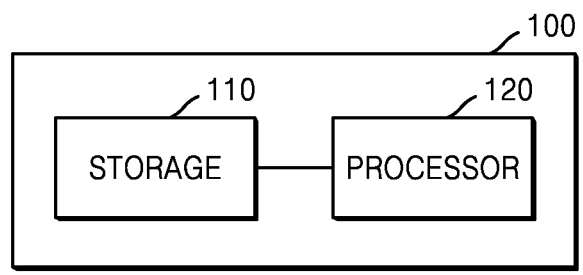
FIG. 1 is a block diagram showing a storage device according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of the present application. For example, the sequences of operations described herein are merely examples, and are not limited to those set forth herein, but may be changed as will be apparent after an understanding of the disclosure of the present application, with the exception of operations necessarily occurring in a certain order. Also, descriptions of features that are known after an understanding of the disclosure of the present application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of the present application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Hereinafter, examples will be described in detail with reference to the accompanying drawings.

FIG. 1 is a block diagram showing a storage device according to an example embodiment.

Referring to FIG. 1, a device 100 for storing data may include a storage 110 and a processor 120. According to an example embodiment, the device 100 for storing data may be connected to an external memory and/or communicate with an external device. The device 100 for storing data shown in FIG. 1 may include components associated with the current example. However, the disclosure is not limited thereto, and as such, it will be clear to those skilled in the art that the device 100 for storing data may further include other general components in addition to the components shown in FIG. 1.

Here, the device 100 for storing data may be any storage that may perform garbage collection. By way of example only, the device 100 for storing data may include a solid state drive (SSD) and/or a flash memory.

In addition, the device 100 for storing data may be implemented in various types of devices such as a personal computer (PC), a server device, a mobile device, an embedded device, and the like. In detail, the device 100 for storing data may be included in a smart phone, a tablet device, an augmented reality (AR) device, an Internet of Things (IoT) device, an autonomous vehicle, a robotic device, or a medical device that may store data, but is not limited to thereof.

The storage 110 may be divided into a plurality of blocks for storing data. For example, the plurality of blocks may be used to store various data processed in the device 100 for storing data. By way of example only, the storage 110 may be a Zone SSD, a Multistream SSD or the like.

The processor 120 may control the overall functions of the device 100 for storing data. For example, the processor 120 may generally control the device 100 for storing data by executing a program stored in the storage 110. The processor 120 may be implemented as a central processing unit (CPU), a graphics processing unit (GPU), or an application processor (AP) included in the device 100 for storing data, but is not limited thereto.

Here, the processor 120 may control the garbage collection operation of the device 100 for storing data. For example, the processor 120 may be configured to: select, based on a request for garbage collection, at least one block from a plurality of blocks in a storage device as a evicting block or a target block based on an expected expiration time of each of the plurality of blocks and perform garbage collection based on the selected at least one block. According to an example embodiment, in response to a request for garbage collection, the processor 120 may be configured to select at least one block from a plurality of blocks in a storage device as a evicting block or a target block based on an expected expiration time of each of the plurality of blocks. According to an example embodiment, the expected expiration time of each block may be obtained based on an expected expiration time of valid data of each block.

That is, the device 100 for storing data may select a evicting block or a target block from a plurality of blocks in consideration of an expected expiration time of each block obtained based on an expected expiration time of valid data of each block, so that an appropriate evicting block and/or a target block may be selected, thereby performing garbage collection more efficiently, reducing write magnification, and greatly prolonging the service life of a storage apparatus.

Hereinafter, an example of a method of storing data executed by the processor 120 will be described with reference to FIGS. 2 to 6.

Figure 2:
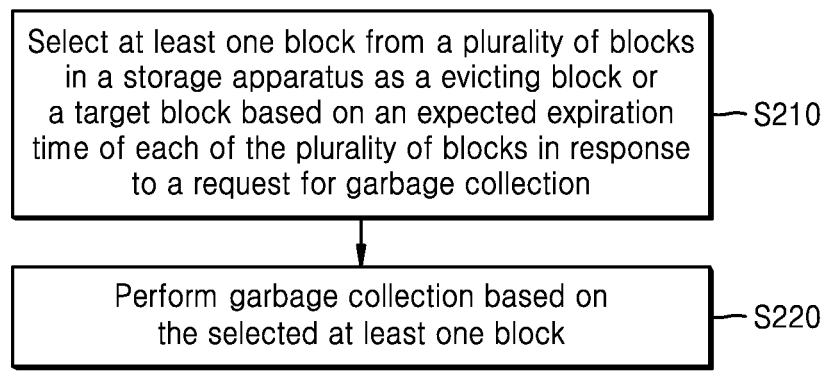
FIG. 2 is a flowchart illustrating a method of storing data performed by a processor according to an example embodiment of the disclosure.

FIG. 2 is a diagram illustrating a method of storing data performed by a processor according to an example embodiment of the disclosure.

Referring to FIG. 2, in operation S210, the processor may select at least one block from a plurality of blocks in a storage device as a evicting block or a target block based on an expected expiration time of each of the plurality of blocks in response to a request for garbage collection. Here, the expected expiration time of each block may be obtained based on an expected expiration time of valid data of each block.

According to an example embodiment, in response to a request for garbage collection, the processor may select at least one block from a plurality of blocks in a storage device as a evicting block based on an expected expiration time of each of the plurality of blocks, and the processor may use any other selection scheme to select at least one block different from the evicting block from the plurality of blocks as a target block in response to the request for garbage collection. Here, any other selection scheme may be any existing scheme or related art scheme for selecting the target block from a plurality of blocks. For example, by way of example only, any other selection scheme may include but is not limited to a random selection scheme, a scheme for selecting a target block based on the remaining space of the block and the like. Selecting at least one block from a plurality of blocks as a evicting block will be described later in more detail in conjunction with FIGS. 3 and 4.

In another example embodiment, in response to a request for garbage collection, the processor may select at least one block from a plurality of blocks as a target block based on an expected expiration time of each of the plurality of blocks in the storage apparatus; and the processor may use any other selection scheme to select at least one block different from the target block from the plurality of blocks as a evicting block in response to the request for garbage collection. Here, any other selection scheme may be any existing scheme for selecting the evicting block from a plurality of blocks. For example, by way of example only, any other selection scheme may include but is not limited to a random selection scheme, a scheme for selecting a evicting block based on the amount of valid data of a block and the like. Selecting at least one block from a plurality of blocks as a target block will be described later in more detail in conjunction with FIGS. 5 and 6.

In yet another example embodiment, in response to a request for garbage collection, the processor may select at least one block from the plurality of blocks as a evicting block based on an expected expiration time of each of the plurality of blocks in the storage apparatus, and select at least one block different from the evicting block from the plurality of blocks as a target block based on the expected expiration time of each of the plurality of blocks in the storage apparatus.

According to an example embodiment of the disclosure, the processor may select at least one block from a plurality of blocks as a evicting block such that an expected expiration time of the selected evicting block is greater than or equal to expected expiration times of other blocks in the plurality of blocks. That is, in the example embodiment, the processor may select a block having a relatively large expected expiration time from a plurality of blocks as a evicting block, and thus when garbage collection is performed on the block having a relatively large expected expiration time as the evicting block, the number of transits of valid data in the block and the overhead of garbage collection can be reduced, write magnification can be reduced, and the service life of the storage apparatus can be greatly improved. Here, the number of transits of valid data in the block may refer to a number of times the valid data is moved from a first bock to a second block.

Further, in one example, the expected expiration time of each block is an average of the expected expiration times of the valid data of each block. For example, when first valid data having a first expected expiration time and second valid data having a second expected expiration time are stored in a first block, the expected expiration time of the first block is an average of the first expected expiration time and the second expected expiration time.

By way of example only, the data of each block may be data of a data file of a database. For example, the data of each block is data of a data file of a log structure merge tree (LSM-Tree) database. The expected expiration time of the valid data of each block is obtained according to an expected expiration time of the data file to which the valid data belongs. In one example, the processor can consistently count the historical data files of the LSM-Tree database and calculate the average lifetime of the data files at each level. When a new file is created, the processor can obtain the creation time, size and level information of the data file from the database application, and then estimate the expected expiration time of the new data file according to the level information of the data file and using the average lifetime of the data file of the level as the lifetime of the new data file. For example, the processor can define the expected expiration time of valid data as "creation time+lifetime" and store it in the file property table. When a file is deleted, the true lifetime and expiration time of the file can be updated. Here, the expected expiration time of the data file may correspond to the expected expiration time of the valid data. In addition, the processor can define the expected expiration date of valid data as "creation time+lifetime-current time". The "creation time+lifetime" of the valid data can indicate an estimated expiration time of the valid data. Although the above example shows an exemplary method of obtaining the estimated expiration time of the valid data, the disclosure is not limited thereto, and various methods of obtaining the estimated expiration time of the valid data may exist. For example, the estimated expiration time of the valid data may be obtained based on the source, purpose, content, etc. of the valid data.

In operation S220, the processor may perform garbage collection based on the selected at least one block.

That is, according to the method of storing data of an example embodiment of the disclosure, it is possible to select a evicting block or a target block from a plurality of blocks in consideration of an expected expiration time of each block obtained based on an expected expiration time of valid data of each block, so that an appropriate evicting block and/or a target block may be selected, thereby performing garbage collection more efficiently, reducing write magnification, and greatly prolonging the service life of a storage apparatus.

According to another example embodiment of the disclosure, the method of storing data may further include generating a request for garbage collection. For example, the processor may obtain operating parameters of the database and determine whether input/output of the database is busy using a pre-trained machine learning model with the operating parameters as inputs. According to an example embodiment, the operating parameters include at least one of a number of files waiting for compaction, a number of files being compacted, a number of files waiting for flush, and a number of files being flushed in the database. According to an example embodiment, the database may be LSM-Tree database. The processor may generate a request for garbage collection when the LSM-Tree database input/output is not busy.

As such, according to the method of storing data of the another example embodiment of the disclosure, garbage collection may not be blindly performed, but instead the garbage collection may be performed or executed on at least one block when the input/output of the database is determined to be not busy, so that the influence on the bandwidth of a device for storing data when garbage collection is performed can be reduced, and the performance of the device for storing data can be remarkably improved.

In other words, according to the method of storing data of the another example embodiment of the disclosure, the storage device can be automatically optimized to reduce garbage collection overhead, thereby reducing write amplification and improving the performance and service life of the storage device. In addition, according to the method of storing data of the another example embodiment of the disclosure, it is possible to improve the maximum space utilization of the storage apparatus, which is defined as a ratio of valid data capacity in the storage apparatus to the capacity of the whole storage apparatus when the LSM-tree database data cannot be written.

Further, in one example, the processor may determine whether the input/output of the database is busy by comparing statistics obtained by calculating the operating parameters to a threshold. For example, by way of example only, the processor may use statistical methods to determine whether the input/output of the database is busy. According to an example embodiment, the statistical method may include a weighted average method etc. In an example of using the weighted average method, the processor may use an average parameter value of historical parameters as a threshold. According to an example embodiment, historical parameters may include at least one of the number of files waiting for compaction, the number of files being compacted, the number of files waiting for flush, and the number of files being flushed in the database, etc. When the weighted value is greater than the threshold, the processor may determine that the input/output of the database is busy; otherwise, the processor may determine that the input/output of the database is not busy.

In addition, the method of storing data according to the disclosure may occupy very little computing and storage resources, and therefore is easy to be implemented.

Figure 3:
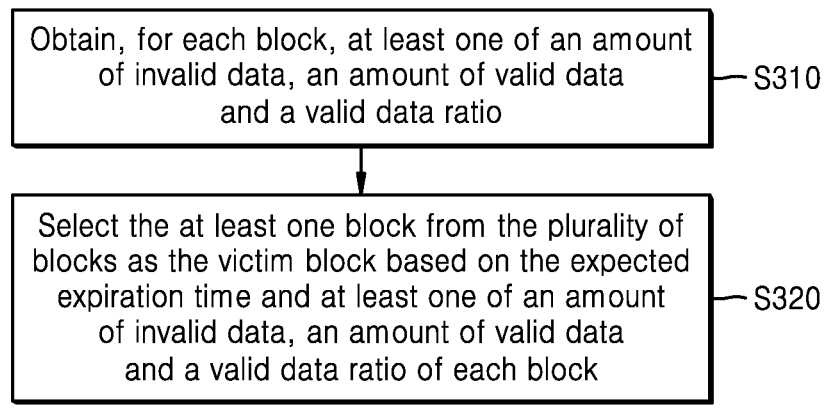
FIG. 3 shows a block diagram of a method of selecting a evicting block from a plurality of blocks according to an example embodiment of the disclosure.

FIG. 3 shows a block diagram of a method of selecting a evicting block from a plurality of blocks according to an example embodiment of the disclosure.

Referring to FIG. 3, in operation S310, the processor may obtain, for each block, at least one of an amount of invalid data, an amount of valid data and a valid data ratio.

in operation S320, the processor may select the at least one block from the plurality of blocks as the evicting block based on the expected expiration time and at least one of an amount of invalid data, an amount of valid data and a valid data ratio of each block. According to an example embodiment, the valid data ratio of each block indicates a ratio between the amount of valid data for the block and a total amount of data in the block.

According to the example embodiment of the disclosure, since a block attribute including at least one of an amount of valid data of a block, an amount of invalid data of the block and a valid data ratio of the block and an expected expiration time of the block can be taken into account to select a evicting block, a processor can select an appropriate evicting block, thereby executing garbage collection more effectively, reducing write magnification, and greatly prolonging the service life of the storage apparatus.

In one example embodiment, the processor may calculate a score for each block based on the block attributes of the plurality of blocks and select the appropriate block as the evicting block based on the score level. As described above, block attributes of a block include, as an example, at least one of an amount of valid data of the block, an amount of invalid data of the block, and a valid data ratio of the block, and an expected expiration time of the block.

As described above, by applying the method according to an example embodiment of the disclosure, it is possible to select a evicting block based on any one attribute of the attributes of the amount of valid data of the block, the amount of invalid data of the block and the valid data ratio of the block, and the expected expiration time of the block.

In one example, a score corresponding to each attribute of each block may be calculated, and a result of adding the scores corresponding to attributes of each block is the score of each block; and the scores of each block can also be calculated by summing after assigning the corresponding weights to the attributes according to the actual situation. The present application is not specifically limited to the specific implementation method.

It will be understood by those skilled in the art that the longer the expected expiration time of a block, the less the amount of valid data of the block, the larger the amount of invalid data of the block, and the lower the proportion of valid data of the block, all indicate that the block is appropriate to serve as a evicting block. Based on this, in an example, the following principles can be adopted when calculating the score of each block: the higher the expected expiration time of the block, the lower the score corresponding to the expected expiration time of the block; the more the amount of valid data of the block, the higher the score corresponding to the amount of valid data of the block; the more the amount of invalid data of the block, the lower the score corresponding to the amount of invalid data of the block; and the higher the valid data ratio of the block, the higher the score corresponding to the valid data ratio of the block. In this way, the lower the score of the block, the more suitable the block is to be selected as the evicting block. Based on this, in another example, the following principles can also be adopted when calculating the score of each block: the longer the expected expiration time of the block, the higher the score of the block; the more the amount of valid data of the block, the lower the score of the block; the more the amount of invalid data of the block, the higher the score of the block; and the higher the valid data ratio of the block, the lower the score of the block. In this way, the higher the score of the block, the more suitable the block is to be selected as the evicting block.

In the above example, although the relative relationship between the score of the block and the respective attributes of the block is shown, the disclosure is not limited thereto, and the score of the block may also be based on a plurality of attributes of the block.

After calculating the scores of the plurality of blocks, the processor may select at least one block from the plurality of blocks as a evicting block. In the above example where the block with a low score is suitable serving as a evicting block, at least one block with a low score may be selected from a plurality of blocks as a evicting block.

Since the evicting block selected by the processor from the plurality of blocks has at least one attribute of a large amount of invalid data, a small amount of valid data, and a small valid data ratio, and the attribute of a long expected expiration time, it can reduce the number of transits of valid data in the block and the overhead of garbage collection, reduce write amplification, and greatly improve the service life of the storage apparatus.

Figure 4:
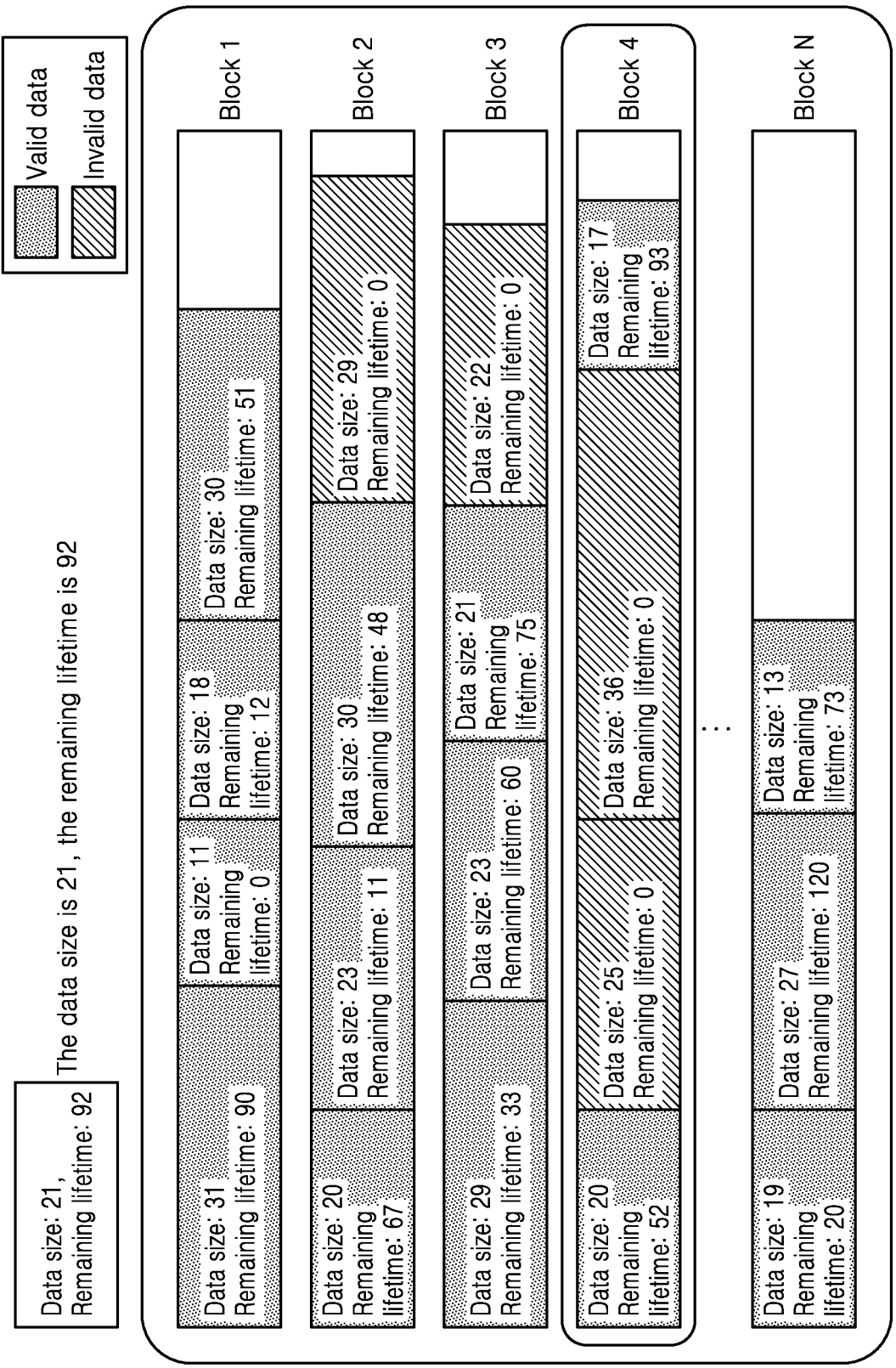
FIG. 4 shows a diagram of a plurality of blocks according to an example embodiment of the disclosure.

FIG. 4 shows a diagram of a plurality of blocks according to an example embodiment of the disclosure.

Referring to FIG. 4, a plurality of blocks in the storage device may include block 1 to block N, where N is a positive integer. The blocks 1 to N may store one or more of valid data and invalid data. The number of pieces of data in each block can be one or more.

For example, in FIG. 4, the block 1 may include three pieces of valid data and one piece of invalid data, wherein data sizes of the three pieces of valid data are 31, 18 and 30, the remaining lifetimes of the three pieces of valid data are 90, 12 and 51, and the data size of the one piece of invalid data is 11. Similarly, the blocks 2 to N may include respective valid data and/or invalid data. Here, the remaining lifetime of the valid data may be a difference between the expected expiration time of the valid data and the current time.

In one example, the remaining lifetime of a block is an average of the remaining lifetime of all valid data in the block. For example, the remaining lifetime of the block 1 may be an average (i.e., 51) of the remaining lifetimes (i.e., 90, 12, and 51) of the three pieces of valid data of the block 1. The remaining lifetime of the block 2 may be an average (i.e., 42) of the remaining lifetimes (i.e., 67, 11, and 42) of the three pieces of valid data of the block 2. Similarly, the remaining lifetimes (i.e., 56, 73 and 71) of block 3, block 4 and block N may be determined, respectively.

As an example, in the example where the block with a low score is suitable serving as the evicting block, the processor may perform a normalization process on the remaining lifetime of the block, and then define the score of the block as "1—the normalized value of the remaining lifetime of the block". According to an example embodiment, the normalization process may include the remaining lifetime of the block is divided by the maximum value of the remaining lifetimes of all blocks. Based on this, the scores of blocks 1 to N are calculated as 0.30, 0.42, 0.23, 0, and 0.02, respectively. A block with a lower score (e.g., one or more of block 4 and block N) is then selected as the evicting block. However, the calculation of the score above is only an example, and as such, the disclosure is not limited to the calculation of the score above. According to an example embodiment of the disclosure, the higher the remaining lifetime of a block, the lower the score of the block. That is, the larger (or longer) the expected expiration time of a block, the lower the score of the block.

In yet another example, the processor may calculate the amount of valid data for the block. For example, referring to FIG. 4, the amount of valid data of block 1 may be a sum of the three pieces of valid data of block 1 (i.e., 79). Similarly, the amounts of valid data for blocks 2 to N may be 73, 73, 37 and 59, respectively.

Combined with FIG. 3, in the above example where the block with a low score is suitable serving as a evicting block, when selecting the evicting block by selecting the two attributes of the amount of the valid data and remaining lifetime, a normalization process is firstly performed on the amount of the valid data and the remaining lifetime of the block, respectively, and then the normalized value of the amount of valid data of the block and the "1—the normalized value of the remaining lifetime of the block" are added as a score of the block. According to an example embodiment, the normalization process may include dividing the amount of valid data of a block by the maximum value of the amount of valid data of all blocks. The normalized values of the valid data quantities of Blocks 1 to N are calculated to be 1, 0.92, 0.47, and 0.75, respectively. Ultimately, the scores of blocks 1 to N are 1.3, 1.34, 1.15, and 0.77. A block with a lower score (e.g., one or more of block 4 and block N) is then selected as the evicting block.

In another example, in the above example where the block with a low score is suitable as a evicting block, when selecting the attributes of the amount of the invalid data and remaining lifetime to select the evicting block, a normalization process (e.g., the amount of invalid data of a block divided by the maximum value of the amount of invalid data of all blocks) is performed on the amount of the invalid data and the remaining lifetime of the block, respectively, and the normalized value of the amount of invalid data of the block and the "1—the normalized value of the remaining lifetime of the block—the normalized value of the amount of invalid data of the block" are added as a score of the block. The normalized values of amounts of the invalid data of bocks 1 to N are calculated to be 0.82, 0.52, 0.64, 0, and 1, respectively. Ultimately, the scores of blocks 1 to N are −0.52, −0.1, −0.41, 0, and −0.98. A block with a lower score (e.g., one or more of block 1 and block N) is then selected as the evicting block.

In another example, in the example where the block with a low score is suitable serving as a evicting block, when the evicting block is selected by selecting the attributes of the amount of the invalid data and remaining lifetime, the valid data ratio of the block and "1—the normalized value of remaining lifetime of the block" may be added as the score of the block. As described above, the valid data ratio of a block indicates a ratio between the amount of valid data in the block and a total amount of data in the block. The valid data ratios of block 1 to block N are 0.88, 0.72, 0.77, 0.38 and 1, respectively. Finally, the scores of blocks 1 to N are 1.18, 1.14, 1, 0.38, and 1.02. A block with a lower score (e.g., one or more of block 3 and block 4) is then selected as the evicting block.

Of course, in another example, the score of the block may be calculated by assigning a weight to each attribute in the above example; similarly, three or four attributes may be selected to calculate the score of the block, so as to select the evicting block more accurately.

It should be noted that the remaining lifetime is used to calculate the score in the selection of the evicting block as an example, and for those skilled in the art, the expected expiration time can also be used to calculate the score in the selection of the evicting block.

For example, in FIG. 4, the expected expiration times of the three pieces of valid data for block 1 are 110, 32, and 71, respectively. In one example, the expected expiration time of a block is the average of the expected expiration times of all valid data in the block. For example, the expected expiration time of block 1 may be an average (i.e., 71) of the expected expiration times (i.e., 110, 32 and 71) of the three pieces of valid data of block 1. The expected expiration time of block 2 may be an average (i.e., 62) of the expected expiration times (i.e., 87, 31 and 68) of the three pieces of valid data of block 2. Similarly, the expected expiration time (i.e., 76, 93, and 91) of block 3, block 4, and block N may be determined, respectively.

As an example, in the example where the block with a low score is suitable serving as a evicting block, the processor may perform a normalization process on the expected expiration time of the block (e.g., the expected expiration time of the block is divided by the maximum value of the expected expiration time of all blocks), and then define the score of the block as "1—the normalized value of the expected expiration time of the block". Based on this, the scores of blocks 1 to N are calculated as 0.24, 0.55, 0.18, 0, and 0.02, respectively. A block with a lower score (e.g., one or more of block 4 and block N) is then selected as the evicting block. However, please note that the calculation of the score above is only an example, and the calculation of the score is not limited thereto.

In addition, as described above, a score of a block may also be calculated by assigning weights to the expected expiration time and other attributes (such as, at least one of the amount of valid data of the block, the amount of invalid data of the block, and the valid data ratio of the block) in the above example. Similarly, three or four attributes can be selected to calculate the score of the block, so as to select the evicting block more accurately.

Figure 5:
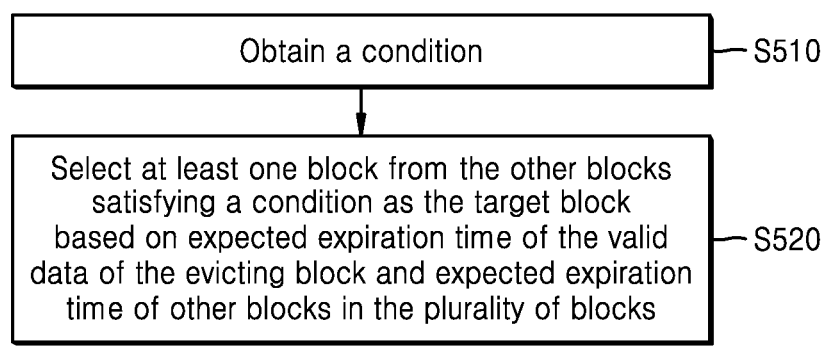
FIG. 5 shows a block diagram of a method of selecting a target block according to an example embodiment of the disclosure.

FIG. 5 shows a block diagram of a method of selecting a target block according to an example embodiment of the disclosure.

Referring to FIG. 5, in operation S520, the processor may select at least one block from the other blocks satisfying a condition as the target block based on an expected expiration time of the valid data of the evicting block and an expected expiration time of other blocks in the plurality of blocks. According to an example embodiment, the condition may be a preset condition. For example, according to some example embodiment, in S510, the processor may obtain a condition before selecting the target block.

According to the example embodiment of the disclosure, an expected expiration time of valid data of the evicting block and an expected expiration time of other blocks in the plurality of blocks can be taken into account to select the target block, a processor can select an appropriate target block for valid data to be evicted, thereby executing garbage collection more efficiently, reducing write magnification, and greatly prolonging the service life of the storage apparatus.

In one example embodiment, the preset condition may include a difference between the expected expiration time of the valid data of the evicting block and the expected expiration time of the selected target block being less than or equal to a preset value. In one example, the preset value may be a predetermined percentage of the remaining lifetime of the valid data in the evicting block. In this example, the predetermined percentage of the remaining lifetime of the valid data in the evicting block defines a proximity between the expected expiration time of the valid data of the evicting block and the expected expiration time of the selected target block. In addition, a difference between the expected expiration time of the valid data of the evicting block and the expected expiration time of the selected target block may be an absolute value of the difference between the expected expiration time of the valid data of the evicting block and the expected expiration time of the selected target block. In a non-limiting example, the predetermined percentage may be 20%. However, the disclosure is not limited thereto, and the predetermined percentage may be other values.

That is, the processor may preferentially place the valid data of a evicting block in a block with a similar expected expiration time (i.e., a difference between the expected expiration time of the valid data of the evicting block and the expected expiration time of the selected target block being less than or equal to a preset value). Since the processor may place the valid data to be transited in the evicting block in the block with similar expected expiration time, the overhead of garbage collection can be reduced, thereby reducing write amplification, and improving the performance and service life of the storage apparatus.

In addition, when the number of target blocks satisfying the preset condition is plural, the processor may select, from the plurality of target blocks satisfying the preset condition, a block whose remaining available space is closest to the size of the valid data in the evicting block and capable of accommodating the valid data in the evicting block as the target block.

That is, when the number of target blocks satisfying a preset condition is plural, a processor may preferentially place valid data in a evicting block in a block with less remaining available space and capable of accommodating the valid data in the evicting block. Therefore, the processor can erase more invalid data in one garbage collection operation, thereby improving garbage collection performance.

In addition, in response to none of the other blocks satisfying the preset conditions, the processor may select the target block in such a way of selecting a block of which the expected expiration time of valid data is closest to that in the evicting block, and the remaining available space of the block capable of accommodating the valid data in the evicting block.

It should be noted that when a target block is selected, the target block may be selected at a granularity of the evicting block or at a granularity of each valid data of the evicting block, which is not specifically limited in the present application.

It should be noted that if the target block is selected in units of evicting blocks, the expected expiration time of evicting blocks can be obtained based on the expected expiration time of each valid data of evicting blocks, for example, the average value of the expected expiration time of each valid data of evicting blocks.

Figure 6:
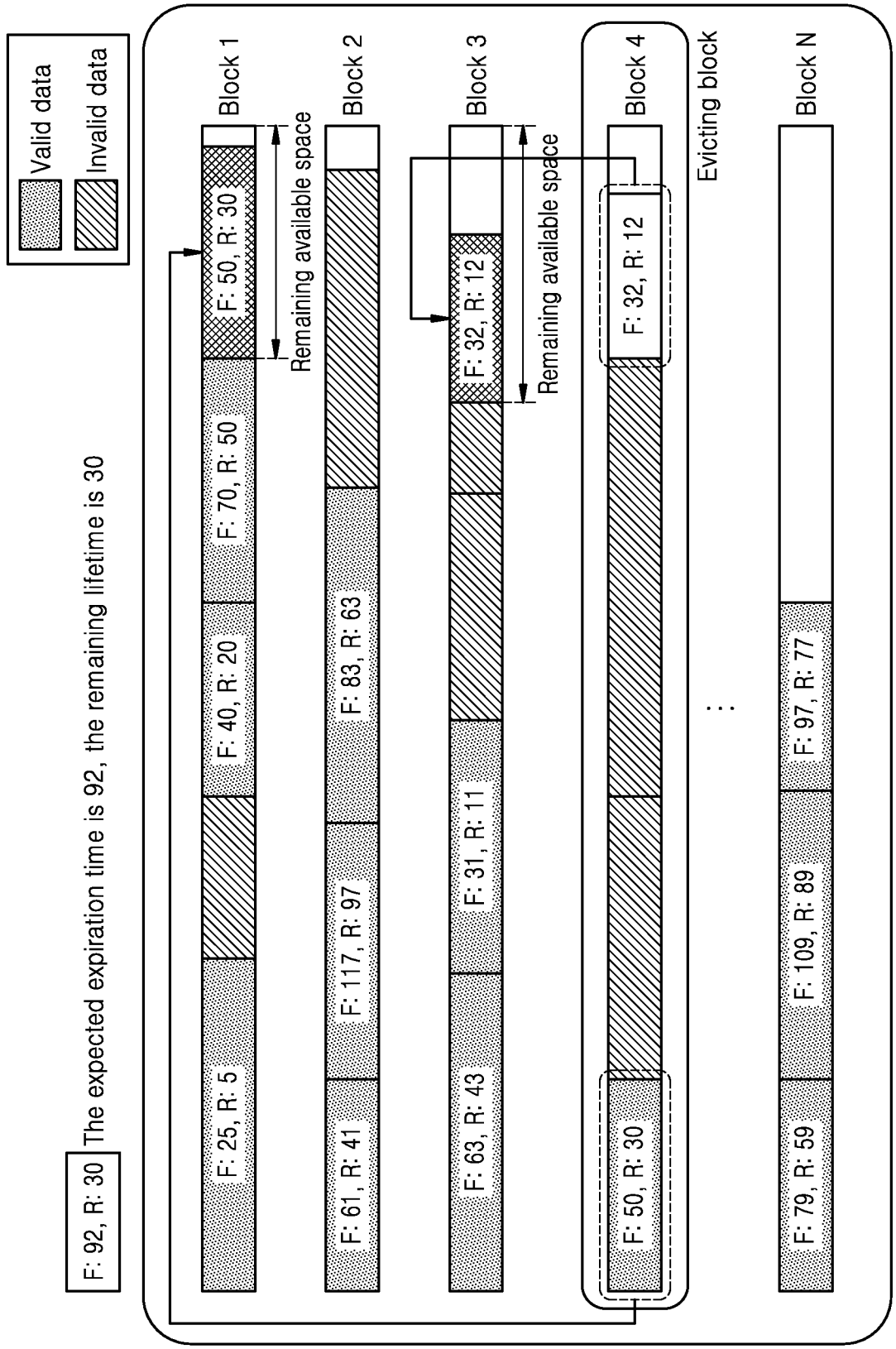
FIG. 6 shows a diagram of a plurality of blocks according to an example embodiment of the disclosure.

FIG. 6 shows a diagram of a plurality of blocks according to an example embodiment of the disclosure.

Referring to FIG. 6, a plurality of blocks in the storage device may include block 1 to block N, where N is a positive integer. The blocks 1 to N may store one or more of valid data and invalid data. The number of pieces of data in each block can be one or more. In FIG. 6, F may denote the expected expiration time, and R may denote the remaining lifetime. Block 4 in FIG. 6 can be used as a evicting block. According to an example embodiment, the current time may be 20. That is, in the example of FIG. 6, F−R=20.

In the example of FIG. 6, the processor may, when the difference between the expected expiration time of valid data of the evicting block and the expected expiration time of a block is less than or equal to a preset value (e.g., the predetermined percentage of the remaining lifetime of valid data (e.g., by way of example only, 20%)), determine that the expiration times are similar, and select the block as the target block, otherwise, the processor may determine that the expiration times are far, and may not select the block as the target block. In one example, the processor may preferentially place the valid data in blocks with similar expected expiration times. If there are multiple blocks with similar expiration times, the processor can determine an allocation strategy according to the amount of remaining available space. That is, the processor may select the target block such that the target block satisfies the preset condition (e.g., the proximity between the expected expiration time of valid data of the evicting block and the expected expiration time of the selected target block is high). In the example of FIG. 6, the preset value is shown as a predetermined percentage of the remaining lifetime of the valid data, but the disclosure is not limited thereto, and the preset value may be any value that may indicate the proximity between the expected expiration time of valid data of the evicting block and the expected expiration time of the selected target block.

In FIG. 6, when block 4 transits valid data as a evicting block, the expected expiration time of the first valid data of the block is 50, which is close to the expected expiration times of block 1 and block 3 within the range of 20% (i.e., 30×20%=6) of its remaining lifetime (i.e., 50±6), so that block 1 and block 3 can meet the preset condition. In addition, since the block 1 has the least remaining available space, the processor may transit the valid data to block 1. The expected expiration time of the second valid data of block 4 is 32, and there is no block with a similar expected expiration time within the range of 20% (i.e., 12×20%≈2) of its remaining lifetime (i.e., 32±2), at this point, there is no block satisfying the preset condition. Thus, the processor may transit the data to block 3 of which the expected expiration time is closest to the data and the remaining space is capable of accommodating the valid data.

Figure 7:
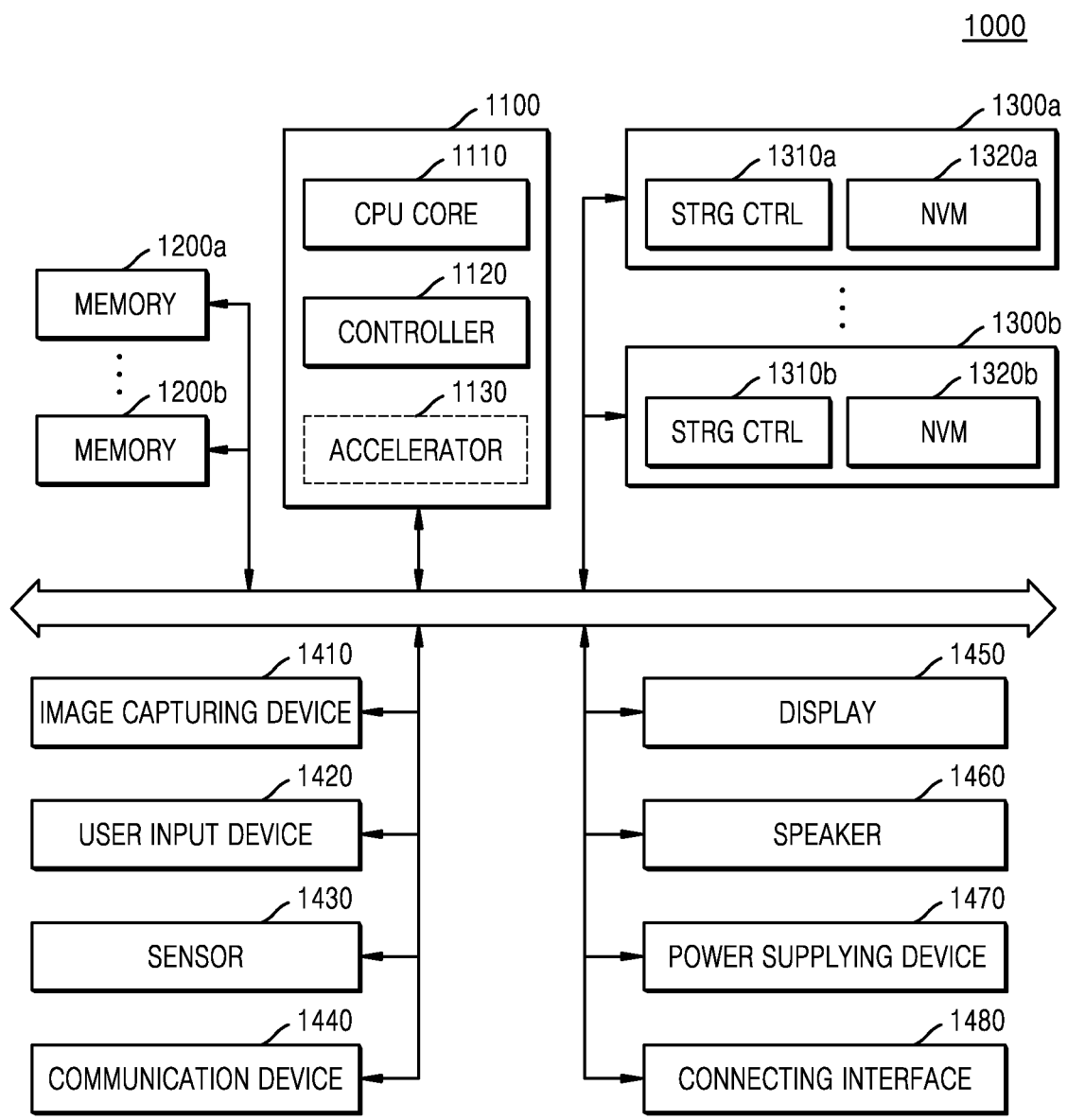
FIG. 7 is a diagram of a system to which a storage device is applied, according to an example embodiment.

FIG. 7 is a diagram of a system 1000 to which a storage device is applied, according to an example embodiment. The system 1000 of FIG. 7 may basically be a mobile system, such as a portable communication terminal (e.g., a mobile phone), a smartphone, a tablet personal computer (PC), a wearable device, a healthcare device, or an Internet of things (JOT) device. However, the system 1000 of FIG. 7 is not necessarily limited to the mobile system and may be a PC, a laptop computer, a server, a media player, or an automotive device (e.g., a navigation device).

Referring to FIG. 7, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

In some example embodiment, memories (e.g., 1200A and 1200b) and storage devices (E.G., 1300A and 1300B) may be included in the device 100 for storing data of FIG. 1. For example, memories (E.G., 1200A and 1200b) and storage devices (E.G., 1300A and 1300B) may store data according to a method of storing data described with reference to at least one of FIGS. 2 to 6.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some example embodiment, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the system 1000. Although each of the memories 1200a and 1200b may include a volatile memory, such as static random access memory (SRAM) and/or dynamic RAM (DRAM), each of the memories 1200a and 1200b may include non-volatile memory, such as a flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRL) 1310a and 1310b and NVM (Non-Volatile Memory)s 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. In addition, the storage devices 1300a and 1300b may have types of solid-state devices (SSDs) or memory cards and be removably combined with other components of the system 100 through an interface, such as the connecting interface 1480 that will be described below. The storage devices 1300a and 1300b may be devices to which a standard protocol, such as an universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, an universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 8:
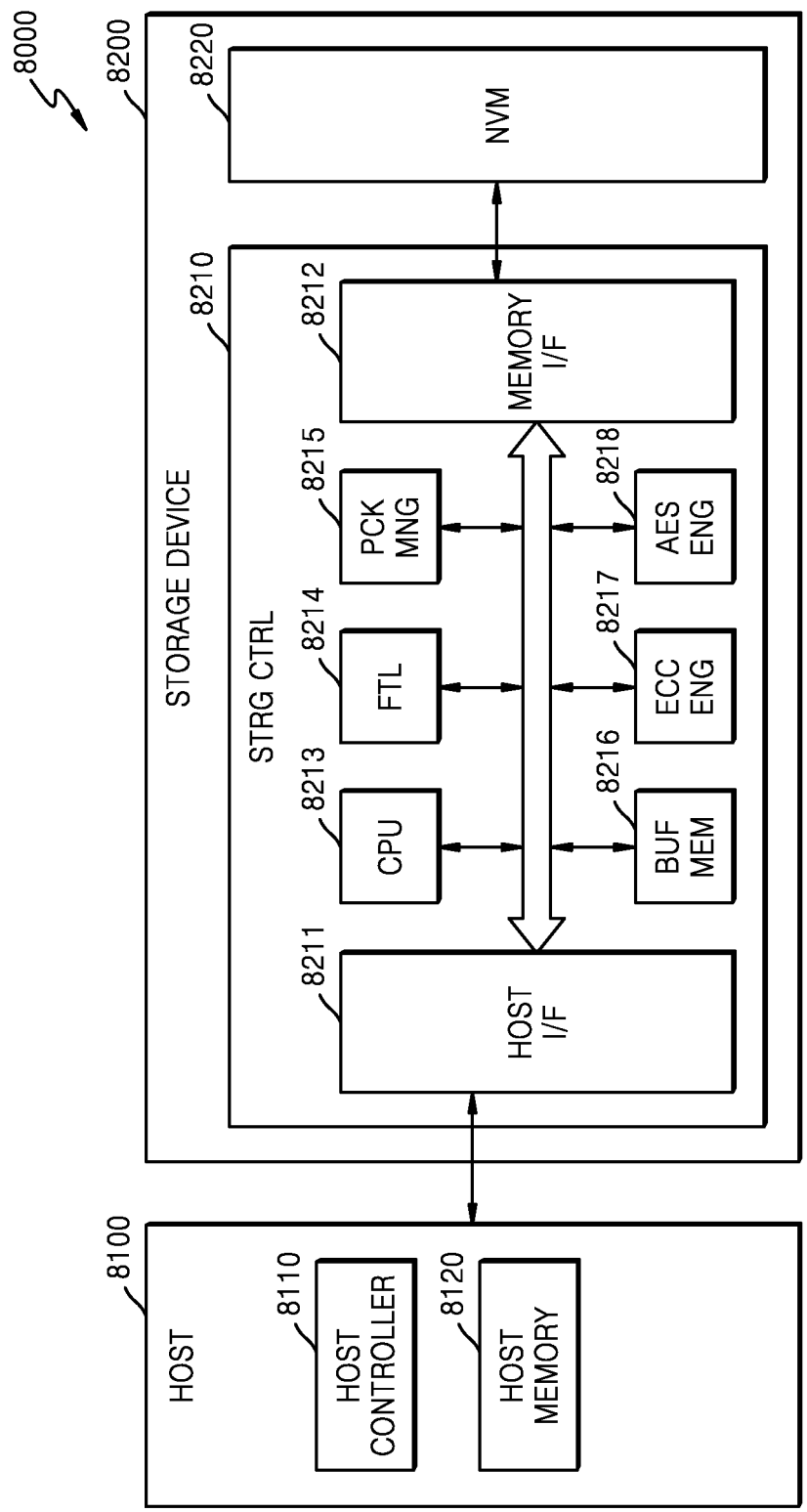
FIG. 8 is a block diagram of a host storage system according to an exemplary embodiment.

FIG. 8 is a block diagram of a host storage system 8000 according to an exemplary embodiment.

The host storage system 8000 may include a host 8100 and a storage device 8200. In addition, the storage device 8200 may include a memory controller 8210 and a NVM 8220. According to an exemplary embodiment of the disclosure, the host 8100 may include a host controller 8110 and a host memory 8120. The host memory 8120 may be used as a buffer memory configured to temporarily store data to be transmitted to or received from the storage device 8200.

In some example embodiment, the host 8100 and the storage device 8200 may correspond to the device 100 for storing data of FIG. 1. For example, the host 8100 and/or the storage device 8200 may perform the method of storing data described with reference to at least one of FIGS. 2 to 6.

The storage device 8200 may include a storage medium configured to store data in response to a request from the host 8100. As an example, the storage device 8200 may include at least one of an SSD, an embedded memory, and a removable external memory. When the storage device 8200 is an SSD, the storage device 8200 may be an NVMe compliant device. When the storage device 8200 is an embedded memory or an external memory, the storage device 8200 may be a device conforming to the UFS standard or eMMC standard. Both the host 8100 and the storage device 8200 can generate a packet and send the packet according to the adopted standard protocol.

When the NVM 8220 of the storage device 8200 includes a flash memory, the flash memory may include a 2D NAND storage array or a 3D (or vertical) NAND (VNAND) storage array. As another example, the storage device 8200 may include various other kinds of NVMs. For example, the storage device 8200 may include magnetic random access memory (MRAM), spin transfer torque MRAM, conductive bridge RAM (CBRAM), ferroelectric RAM (FRAM), PRAM, RRAM, and various other types of memory.

According to an example embodiment, the host controller 8110 and the host memory 8120 may be implemented as separate semiconductor chips. Alternatively, in some example embodiment, the host controller 8110 and the host memory 8120 may be integrated in the same semiconductor chip. As an example, the host controller 8110 may be any one of a plurality of modules included in an application processor (AP). The AP can be implemented as a system on chip (SOC). In addition, the host memory 8120 may be an embedded memory included in the AP or a memory module external to the AP.

The host controller 8110 may manage an operation of storing data (e.g., write data) of the buffer area of the host memory 8120 in the NVM 8220 or an operation of storing data (E.G., read data) of the NVM 8220 in the buffer area.

The memory controller 8210 may include a host interface 8211, a memory interface 8212, and a CPU 8213. In addition, the memory controller 8210 may also include a flash conversion layer (FTL) 8124, a packet manager 8215, a buffer memory 8216, an error correction code (ECC) engine 8217, and an advanced encryption standard (AES) engine 8218. The memory controller 8210 may further include a working memory in which the FTL 8124 is loaded. The CPU 8213 may execute FTL 8124 to control data write and read operations on the NVM 8220.

The host interface 8211 may send and receive packets to and from the host 8100. The packet sent from the host 8100 to the host interface 8211 may include commands or data to be written to the NVM 8220. The packet sent from the host interface 8211 to the host 8100 may include a response to a command or data read from the NVM 8220. The memory interface 8212 may send data to be written to the NVM 8220 or receive data read from the NVM 8220. The memory interface 8212 may be configured to comply with standard protocols such as toggle or open NAND flash interface (ONFI).

FTL 8124 can perform various functions, such as address mapping operation, wear balancing operation and garbage collection operation. The address mapping operation can be the operation of converting the logical address received from host 8100 into the physical address used to actually store data in NVM 8220. The wear balancing operation can prevent excessive degradation of specific blocks by allowing uniform use of NVM 8220 blocks Technology. As an example, the wear equalization operation can be realized by using firmware technology to balance the erase count of physical blocks. The garbage collection operation can be a technology to ensure the available capacity in NVM 8220 by erasing the existing blocks after copying the valid data of the existing blocks to the new blocks.

The packet manager 8215 may generate packets according to a protocol that agrees to the interface of the host 8100, or parse various types of information from packets received from the host 8100. In addition, the buffer memory 8216 may temporarily store data to be written to or read from the NVM 8220. Although the buffer memory 8216 may be a component included in the memory controller 8210, it does not buffer storage, the memory controller 8216 may be external to the memory controller 8210.

ECC engine 8217 can perform error detection and correction operations on the read data read from NVM 8220. More specifically, ECC engine 8217 can generate parity bits for the write data to be written to NVM 8220, and the generated parity bits can be stored in NVM 8220 together with the write data. During reading data from NVM 8220, ECC engine 8217 can use read Data and the parity bit read from NVM 8220 to correct the error in the read data, and output the read data after error correction.

The AES engine 8218 may perform at least one of an encryption operation and a decryption operation on the data input to the memory controller 8210 by using a symmetric key algorithm.

Figure 9:
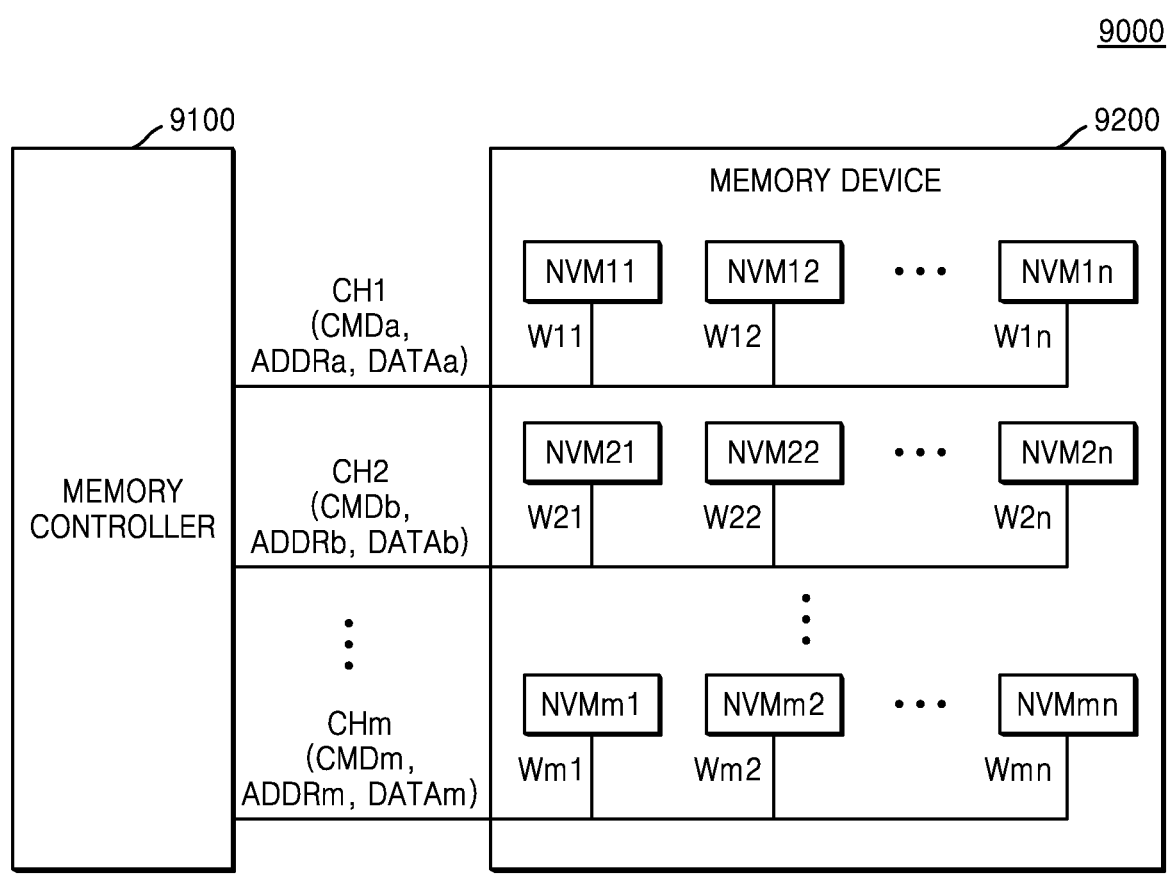
FIG. 9 is a block diagram of a storage system according to an example embodiment of the disclosure.

FIG. 9 is a block diagram of a storage system 9000 according to an example embodiment of the disclosure.

Referring to FIG. 9, the storage system 9000 may include a storage device 9200 and a memory controller 9100. The storage system 9000 may support multiple channels CH1 to CHM, and the storage device 9200 may be connected to the memory controller 9100 through multiple channels CH1 to CHM. For example, storage system 9000 may be implemented as a storage device such as an SSD.

In some example embodiment, the storage system 9000 may correspond to the device 100 for storing data of FIG. 1. For example, the storage system 9000 may perform a method of storing data described with reference to at least one of FIGS. 2 to 6.

The storage device 9200 may include a plurality of NVM devices NVM11 to NVMmn. Each of the NVM devices NVM11 to NVMmn can be connected to one of the plurality of channels CH1 to CHM through its corresponding path. For example, NVM devices NVM11 to NVM1$n$ may be connected to the first channel CH1 through paths W11 to W1$n$, and NVM devices NVM21 to NVM2$n$ may be connected to the second channel CH2 through paths W21 to W2$n$. In an exemplary embodiment, each of the NVM devices NVM11 to NVM1$n$ may be implemented as any storage element, which may operate according to a separate command from the memory controller 9100. For example, each of the NVM devices NVM11 to NVM1$n$ may be implemented as a chip or die, but the disclosure is not limited thereto.

The memory controller 9100 may send and receive signals to and from the storage device 9200 through the plurality of channels CH1 to CHM. For example, the memory controller 9100 may send commands CMDa to CMDm, addresses ADDRa to ADDRm, and data DATAa to DATAm to the storage device 9200 through channels CH1 to CHm, or receive data DATAa to DATAm from the storage device 9200.

The memory controller 9100 may select one from the NVM devices NVM11 to NVMmn connected to each of the channels CH1 to CHM by using the corresponding one of the channels CH1 to CHm, and send and receive signals to and from the selected NVM device. For example, the memory controller 9100 may select the NVM device NVM11 from the NVM devices NVM11 to NVM1$n$ connected to the first channel CH1. The memory controller 9100 can send the command CMDA, address ADDRa and data DATA to the selected NVM device NVM11 through the first channel CH1, or receive data DATA from the selected NVM device NVM11.

The memory controller 9100 may send and receive signals to and from the storage device 9200 in parallel through channels different from each other. For example, the memory controller 9100 may send the command CMDa to the storage device 9200 through the first channel CH1 and the command CMDb to the storage device 9200 through the second channel CH2. For example, the memory controller 9100 may receive data DATAa from the storage device 9200 through the first channel CH1 and data DATAb from the storage device 9200 through the second channel CH2.

The memory controller 9100 may control all operations of the storage device 9200. The memory controller 9100 may send signals to channels CH1 to CHM and control each of the NVM devices NVM11 to NVMmn connected to channels CH1 to CHm. For example, the memory controller 9100 may send a command CMDa and an address ADDRa to the first channel CH1 and control one selected from the NVM devices NVM11 to NVM1*n*.

Each of the NVM devices NVM11 to NVMmn can be operated via the control of the memory controller 9100. For example, the NVM device NVM11 may program the data DATAa based on the command CMDa, the address ADDRa, and the data DATAa provided to the first channel CH1. For example, the NVM device NVM21 may read the data DATAb based on the command CMDB and the address ADDRb provided to the second channel CH2, and send the read data DATAb to the memory controller 9100.

Although FIG. 9 shows an example in which the storage device 9200 communicates with the memory controller 9100 through M channels and includes N NVM devices corresponding to each channel, the number of channels and the number of NVM devices connected to one channel can be changed.

Figure 10:
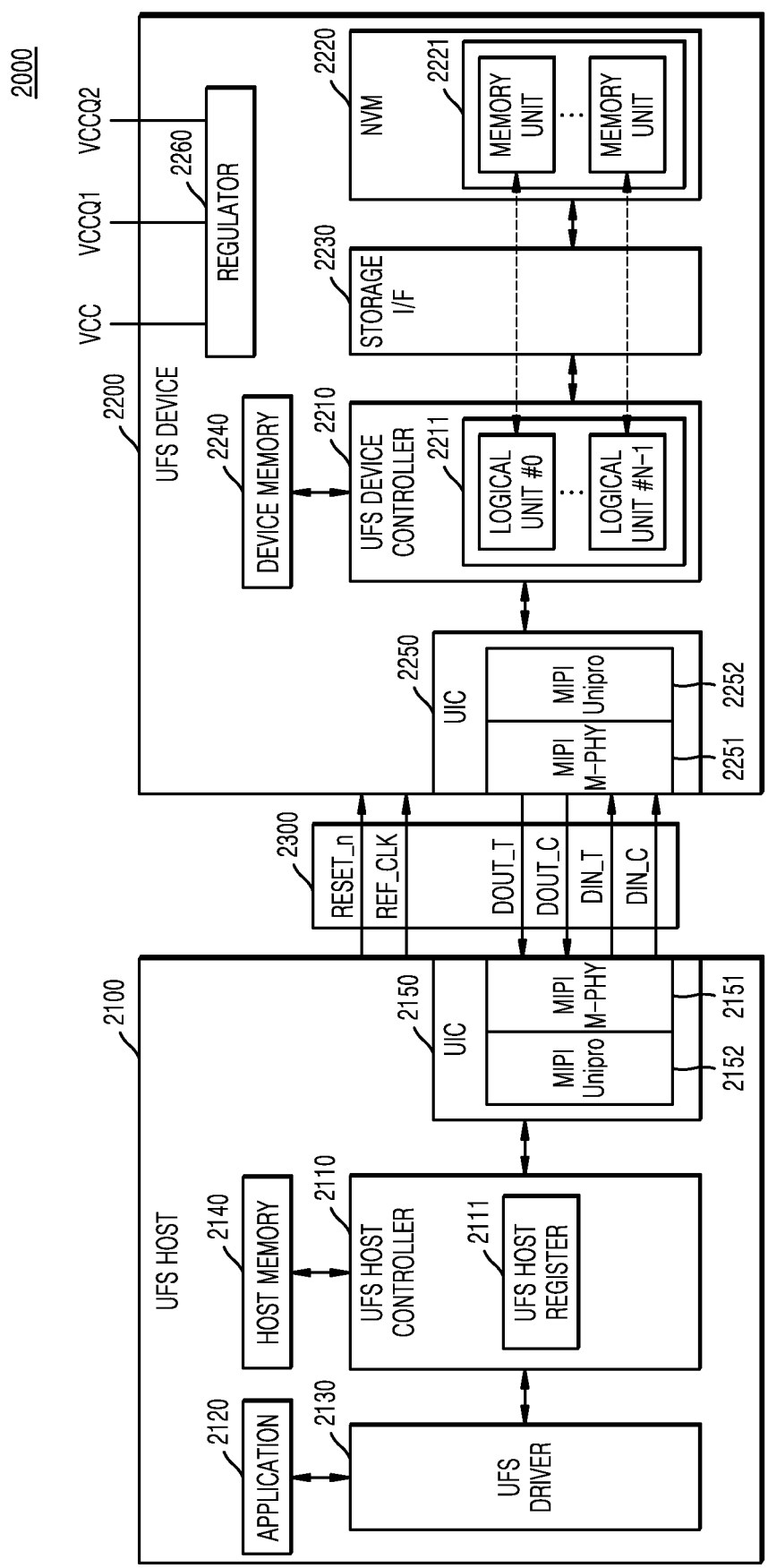
FIG. 10 is a diagram of a UFS system according to an example embodiment.

FIG. 10 is a diagram of a UFS system 2000 according to an example embodiment.

The UFS system 2000 may be a system conforming to a UFS standard announced by Joint Electron Device Engineering Council (JEDEC) and include a UFS host 2100, a UFS device 2200, and a UFS interface 2300. The above description of the system 1000 of FIG. 10 may also be applied to the UFS system 2000 of FIG. 10 within a range that does not conflict with the following description of FIG. 10.

In some example embodiment, the UFS host 2100 and/or the UFS device 2200 may correspond to the device 100 for storing data of FIG. 1. For example, the UFS host 2100 and/or the UFS device 2200 may perform a method of storing data described with reference to at least one of FIGS. 2 to 6.

Referring to FIG. 10, the UFS host 2100 may be connected to the UFS device 2200 through the UFS interface 2300. When the main processor 1100 of FIG. 10 is an AP, the UFS host 2100 may be implemented as a portion of the AP. The UFS host controller 2110 and the host memory 2140 may respectively correspond to the controller 1120 of the main processor 1100 and the memories 1200*a* and 1200*b* of FIG. 10. The UFS device 2200 may correspond to the storage device 1300*a* and 1300*b* of FIG. 10, and a UFS device controller 2210 and an NVM 2220 may respectively correspond to the storage controllers 1310*a* and 1310*b* and the NVMs 1320*a* and 1320*b* of FIG. 10.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of 19.2 MHz, 26 MHz, 38.4 MHz, and 52 MHz, without being limited thereto. The UFS host 2100 may change the frequency of the reference clock signal REF_CLK during an operation, that is, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 10, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 10, the number of transmission lanes and the number of receiving lanes may be changed.

The receiving lane and the transmission lane may transmit data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine embedded therein. More specifically, the ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

In addition, the UFS device controller 2210 may transmit user data, which is temporarily stored in the device memory 2240, to the UFS host 2100. In addition, the UFS device controller 2210 may further include an AES engine. The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array and a control circuit configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of 2.4 V to 3.6 V. The voltage VCCQ may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

Figure 11:
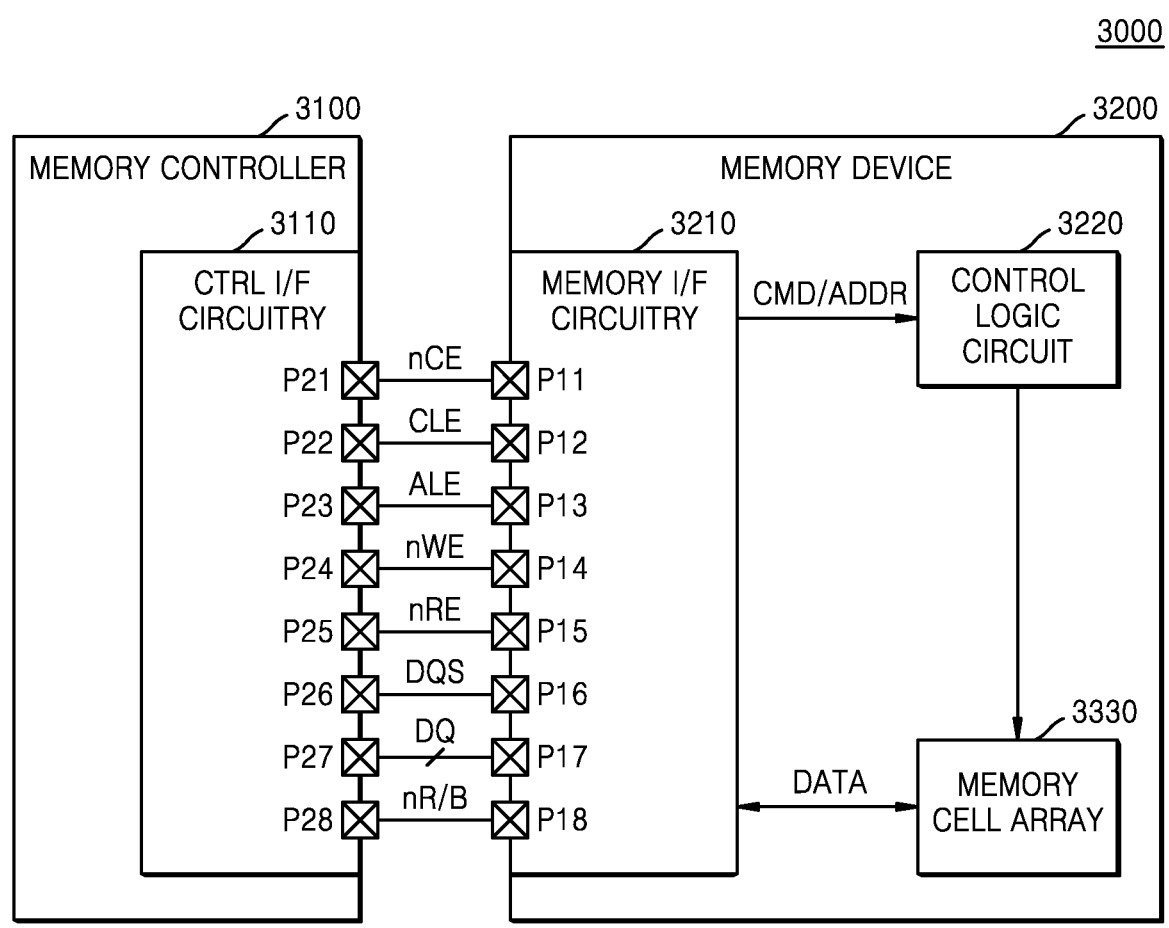
FIG. 11 is a block diagram of a storage system according to an example embodiment of the disclosure.

FIG. 11 is a block diagram of a storage system 3000 according to an example embodiment of the disclosure. Referring to FIG. 11, the storage system 3000 may include a storage device 3200 and a memory controller 3100. The storage device 3200 may correspond to one of the NVM devices NVM11 to NVMmn, which communicates with the memory controller 9100 based on one of the plurality of channels CH1 to CHm of FIG. 9. The memory controller 3100 may correspond to the memory controller 9100 of FIG. 9.

In some example embodiment, the storage system 3000 may correspond to the device 100 for storing data of FIG. 1. For example, the memory controller 3100 and/or the controller logic 3220 may perform a method of storing data described with reference to at least one of FIGS. 2 to 6.

The storage device 3200 may include first to eighth pins P11 to P18, a memory interface circuit 3210, a control logic circuit 3220, and a storage unit array 3330.

The memory interface circuit 3210 may receive the chip enable signal nCE from the memory controller 3100 through the first pin P11. The memory interface circuit 3210 may send and receive signals to and from the memory controller 3100 through the second to eighth pins p12 to P18 in response to the chip enable signal nCE. For example, when the chip enable signal nCE is in the enable state (E.G., low level), the memory interface circuit 3210 may send a signal to and receive a signal from the memory controller 3100 through the second to eighth pins p12 to P18.

The memory interface circuit 3210 may receive a command latch enable signal CLE, an address latch enable signal ALE, and a write enable signal nWE from the memory controller 3100 through the second to fourth pins p12 to P14. The memory interface circuit 3210 may receive the data signal DQ from the memory controller 3100 through the seventh pin p17 or send the data signal DQ to the memory controller 3100. Command CMD, address ADDR and data can be transmitted via data signal DQ. For example, the data signal DQ may be transmitted through a plurality of data signal lines. In this case, the seventh pin p17 may include a plurality of pins corresponding to a plurality of data signals DQ, respectively.

The memory interface circuit 3210 may obtain the command CMD from the data signal DQ received in the enable interval (E.G., high-level state) of the command latch enable signal CLE based on the switching time point of the write enable signal nWE. The memory interface circuit 3210 may obtain the address ADDR from the data signal DQ received in the enable interval (E.G., high-level state) of the address latch enable signal ALE based on the switching time point of the write enable signal nWE.

In an exemplary embodiment, the write enable signal nWE may remain static (E.G., high level or low level) and switch between high level and low level. For example, the write enable signal nWE can be switched in the interval where the command CMD or address ADDR is sent. Therefore, the memory interface circuit 3210 can obtain the command CMD or address ADDR based on the switching time point of the write enable signal nWE.

The memory interface circuit 3210 may receive the read enable signal nRE from the memory controller 3100 through the fifth pin P15. The memory interface circuit 3210 may receive the data strobe signal DQS from the memory controller 3100 through the sixth pin p16, or may send the data strobe signal DQS to the memory controller 3100.

In the data (DATA) output operation of the storage device 3200, the memory interface circuit 3210 may receive the read enable signal nRE switched by the fifth pin p15 before outputting the data DATA. The memory interface circuit 3210 may generate a data strobe signal DQS, which is switched based on the switching of the read enable signal nRE. For example, the memory interface circuit 3210 may generate a data strobe signal DQS based on the switching start time of the read enable signal nRE, which starts switching after a predetermined delay (E.G., tDQSRE). The memory interface circuit 3210 may transmit a data signal DQ including data DATA based on the switching time point of the data strobe signal DQS. Therefore, the data DATA can be aligned with the switching time point of the data strobe signal DQS and transmitted to the memory controller 3100.

In the data (DATA) input operation of the storage device 3200, when the data signal DQ including data DATA is received from the memory controller 3100, the memory interface circuit 3210 may receive the switched data strobe signal DQ and data DATA. The memory interface circuit 3210 may obtain data DATA from the data signal DQ based on the switching time point of the data strobe signal DQS. For example, the memory interface circuit 3210 may sample the data signal DQ at the rising and falling edges of the data strobe signal DQS and obtain data DATA.

The memory interface circuit 3210 can send the ready/busy output signal nR/B to the memory controller 3100 through the eighth pin P18. The memory interface circuit 3210 may transmit the status information of the storage device 3200 to the memory controller 3100 through the ready/busy output signal nR/B. When the storage device 3200 is in a busy state (i.e., when an operation is being performed in the storage device 3200), the memory interface circuit 3210 may send a ready/busy output signal nR/B indicating the busy state to the memory controller 3100. When the storage device 3200 is in the ready state (i.e., when no operation is performed or completed in the storage device 3200), the memory interface circuit 3210 may send the ready/busy output signal nR/B indicating the ready state to the memory controller 3100. For example, when the storage device 3200 reads data from the storage unit array 3330 in response to a page reading command, the memory interface circuit 3210 may send a ready/busy output signal nR/B indicating a busy state (E.G., low level) to the memory controller 3100. For example, when the storage device 3200 programs the data DATA to the storage unit array 3330 in response to the programming command, the memory interface circuit 3210 may send the ready/busy output signal nR/B indicating the busy state to the memory controller 3100.

The control logic 3220 may control all operations of the storage device 3200. The control logic circuit 3220 may receive a command/address CMD/ADDR obtained from the memory interface circuit 3210. The control logic 3220 may generate control signals for controlling other components of the storage device 3200 in response to the received command/address CMD/ADDR. For example, the control logic circuit 3220 may generate various control signals for programming data DATA to or reading data DATA from the storage unit array 3330.

The storage unit array 3330 may store the data DATA obtained from the memory interface circuit 3210 via the control of the control logic circuit 3220. The storage unit array 3330 may output the stored data DATA to the memory interface circuit 3210 via the control of the control logic circuit 3220.

The storage unit array 3330 may include a plurality of storage units. For example, a plurality of storage units may be flash memory units. However, the disclosure is not limited to this, and the storage unit may be an RRAM unit, a FRAM unit, a PRAM unit, a thyristor RAM (TRAM) unit or an MRAM unit. Hereinafter, an example embodiment in which the storage unit is a NAND flash memory unit will be mainly described.

The memory controller 3100 may include first to eighth pins P21 to P28 and a controller interface circuit 3110. The first to eighth pins P21 to P28 may correspond to the first to eighth pins P11 to P18 of the storage device 3200, respectively.

The controller interface circuit 3110 may send the chip enable signal nCE to the storage device 3200 through the first pin P21. The controller interface circuit 3110 may send a signal to and receive a signal from the storage device 3200 through the second to eighth pins P22 to P28, wherein the storage device 3200 is selected by the chip enable signal nCE.

The controller interface circuit 3110 may send the command latch enable signal CLE, the address latch enable signal ALE and the write enable signal nWE to the storage device 3200 through the second to fourth pins P22 to p24. The controller interface circuit 3110 may send or receive the data signal DQ to or from the storage device 3200 through the seventh pin p27.

The controller interface circuit 3110 may transmit the data signal DQ including the command CMD or address ADDR and the switched write enable signal nWE to the storage device 3200. The controller interface circuit 3110 may transmit the data signal DQ including the command CMD to the storage device 3200 by transmitting the command latch enable signal CLE with the enable state. Moreover, the controller interface circuit 3110 may transmit the data signal DQ including the command CMD to the storage device 3200 through an address latch enable signal ALE having an enable state is transmitted to transmit a data signal DQ including an address ADDR to the storage device 3200.

The controller interface circuit 3110 may send the read enable signal nRE to the storage device 3200 through the fifth pin P25. The controller interface circuit 3110 may receive the data strobe signal DQS from the storage device 3200 or send the data strobe communication signal DQS to the storage device 3200 through the sixth pin P26.

In the data (DATA) output operation of the storage device 3200, the controller interface circuit 3110 may generate a switched read enable signal nRE and send the read enable signal nRE to the storage device 3200. For example, before outputting the data DATA, the controller interface circuit 3110 may generate a read enable signal nRE from a static state (e.g., high level or low level). Therefore, the storage device 3200 can generate the switched data strobe signal DQS based on the read enable signal nRE. The controller interface circuit 3110 can receive the data signal DQ including data DATA and the switched data strobe signal DQS from the storage device 3200. The controller interface circuit 3110 can obtain data DATA from the data signal DQ based on the switching time point of the data strobe signal DQS.

During the data (DATA) input operation of the storage device 3200, the controller interface circuit 3110 may generate a switched data strobe signal DQS. For example, before transmitting the data DATA, the controller interface circuit 3110 may generate a data strobe signal DQS from a static state (E.G., high level or low level), which may transmit the data signal DQ including the data DATA to the storage device 3200 based on the switching time point of the data strobe signal DQS.

The controller interface circuit 3110 may receive the ready/busy output signal NR/B from the storage device 3200 through the eighth pin P28. The controller interface circuit 3110 may determine the status information of the storage device 3200 based on the ready/busy output signal nR/B.

Figure 12:
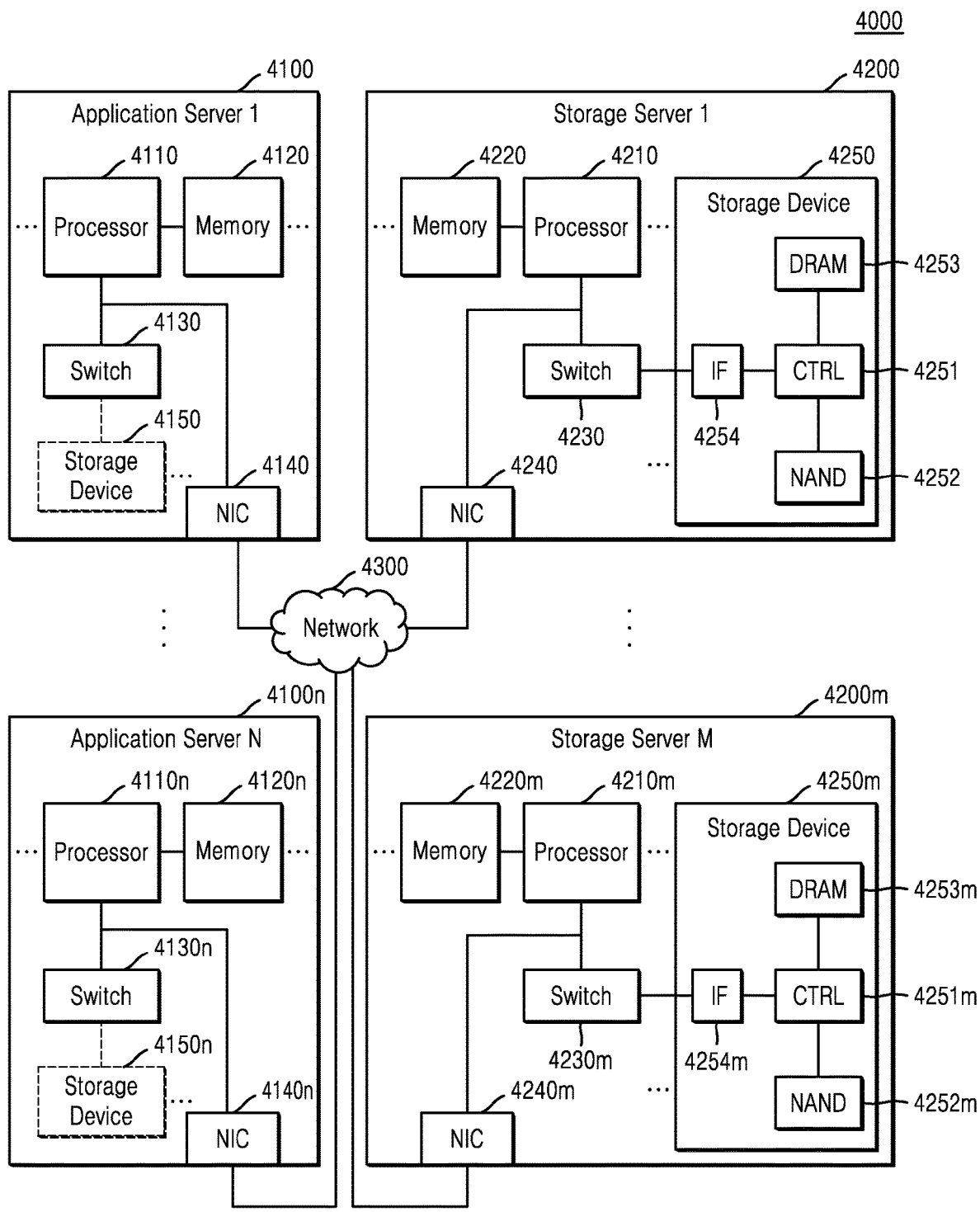
FIG. 12 is a block diagram of a data center to which a storage device is applied according to an example embodiment of the disclosure.

FIG. 12 is a block diagram of a data center 4000 to which a storage device is applied according to an example embodiment of the disclosure.

Referring to FIG. 12, the data center 4000 may be a facility for collecting various types of data and providing services, and is referred to as a data storage center. The data center 4000 may be a system for operating search engines and databases, and may be a computing system used by companies (such as banks) or government agencies. The data center 4000 may include application servers 4100 to 4100n and storage servers 4200 to 4200m. According to an example embodiment, the number of applications 4100 to 4100n and the number of storage servers 4200 to 4200m can be selected differently. The number of application servers 4100 to 4100n and the number of storage servers 4200 to 4200m may be different from each other.

In some example embodiment, the storage server 4200 and/or the application server 4100 may correspond to the device 100 for storing data of FIG. 1. For example, the storage server 4200 and/or the application server 4100 may perform a method of storing data described with reference to at least one of FIGS. 2 to 6.

The application server 4100 or the storage server 4200 may include processors 4110 and 4210 and at least one of memories 4120 and 4220. The storage server 4200 will now be described as an example. The processor 4210 may control all operations of the storage server 4200, access the memory 4220, and execute instructions and/or data loaded into the memory 4220. The memory 4220 may be a dual data rate synchronous DRAM (DDR SDRAM), a high bandwidth memory (HBM), a hybrid memory cube (HMC), a dual in-line memory module (DIMM), an otane DIMM, or a nonvolatile DIMM (NVMDIMM). In some example embodiment, the number of processors 4210 and memory 4220 included in the storage server 4200 may be selected differently. In one example embodiment, processor 4210 and memory 4220 may provide a processor-memory pair. In one example embodiment, the number of processors 4210 and the number of memories 4220 may be different from each other. The processor 4210 may include a single core processor or a multi-core processor. The above description of the storage server 4200 can be similarly applied to the application server 4100. In some example embodiment, the application server 4100 may not include a storage device 4150. The storage server 4200 may include at least one storage device 4250. According to an example embodiment, the number of storage devices 4250 included in the storage server 4200 may be selected differently.

Application servers 4100 to 4100n can communicate with storage servers 4200 to 4200m through network 4300. The network 4300 may be implemented by using fiber channel (FC) or Ethernet. In this case, FC can be a medium for relatively high-speed data transmission, and optical switches with high performance and high availability can be used. According to the access method of the network 4300, the storage servers 4200 to 4200m can be set as file storage, block storage or object storage.

In one example embodiment, the network 4300 may be a network dedicated to storage, such as a storage area network (SAN). For example, a San can be a FC-SAN that uses an FC network and is implemented according to the FC protocol (FCP). As another example, the San may be an Internet Protocol (IP)—SAN, which uses a transmission control protocol (TCP)/IP network and is implemented according to SCSI over TCP/IP or Internet SCSI (iSCSI) protocol. In another example embodiment, the network 4300 may be a general-purpose network, such as a TCP/IP network. For example, the network 4300 may be implemented according to protocols such as FC (FCoE) over Ethernet, network attached storage (NAS), and fabric nvme (NVMe-of).

Hereinafter, the application server 4100 and the storage server 4200 will be mainly described. The description of the application server 4100 may be applied to another application server 4100n, and the description of the storage server 4200 may be applied to another storage server 4200m.

The application server 4100 may store the data requested to be stored by the user or the client in one of the storage servers 4200 to 4200m through the network 4300. In addition, the application server 4100 can obtain data requested to be read by a user or a client from one of the storage servers 4200 to 4200m through the network 4300. For example, the application server 4100 may be implemented as a network server or a database management system (DBMS).

The application server 4100 may access the memory 4120n or the storage device 4150n included in another application server 4100n through the network 4300. Alternatively, the application server 4100 may access the memories 4220 to 4220*m* or storage devices 4250 to 4250*m* included in the storage servers 4200 to 4200*m* through the network 4300. Therefore, the application server 4100 may perform various operations on the data stored in the application servers 4100 to 4100*n* and/or the storage servers 4200 to 4200*m*. For example, the application server 4100 may execute instructions for moving or copying data between the application servers 4100 to 4100*n* and/or the storage servers 4200 to 4200*m*. In this case, data may be transited from the storage devices 4250 to 4250*m* of the storage servers 4200 to 4200*m* through the memories 4220 to 4220*m* of the storage servers 4200 to 4200*m* or directly to the memories 4120 to 4120*n* of the application servers 4100 to 4100*n*. The data transited through the network 4300 may be data encrypted for security or privacy.

The storage server 4200 will now be described as an example. The interface 4254 may provide a physical connection between the processor 4210 and the controller 4251 and a physical connection between the network interface card (NIC) 4240 and the controller 4251. For example, the interface 4254 may be implemented using a direct attached storage (DAS) scheme, where the storage device 4250 is directly connected to a dedicated cable. For example, interface 4254 can be implemented by using various interface schemes, such as ATA, SATA, E-SATA, SCSI, SAS, PCI, PCIe, nvme, IEEE 1394, USB interface, SD card interface, MMC interface, eMMC interface, UFS interface, eUFS interface and CF card interface.

The storage server 4200 may further include a switch 4230 and a network interconnect (NIC) 4240. The switch 4230 may selectively connect the processor 4210 to the storage device 4250 via the control of the processor 4210, or selectively connect the NIC 4240 to the storage device 4250.

In one example embodiment, NIC 4240 may include a network interface card and a network adapter. NIC 4240 can be connected to network 4300 through wired interface, wireless interface, Bluetooth interface or optical interface. The NIC 4240 may include an internal memory, a digital signal processor (DSP), and a host bus interface, and is connected to the processor 4210 and/or the switch 4230 through the host bus interface. The host bus interface may be implemented as one of the above examples of interface 4254. In one example embodiment, NIC 4240 may be integrated with at least one of processor 4210, switch 4230, and storage device 4250.

In storage servers 4200 to 4200*m* or application servers 4100 to 4100*n*, the processor may send commands to storage devices 4150 to 4150*n* and 4250 to 4250*m* or memories 4120 to 4120*n* and 4220 to 4220*m* and program or read data. In this case, the data can be the wrong data corrected by the ECC engine. The data may be data on which a data bus inversion (DBI) operation or a data masking (DM) operation is performed, and may include cyclic redundancy coding (CRC) information. Data can be encrypted for security or privacy.

The storage devices 4150 to 4150*n* and 4250 to 4250*m* may send control signals and command/address signals to the NAND flash memory devices 4252 to 4252*m* in response to a read command received from the processor. Therefore, when reading data from the NAND flash memory devices 4252 to 4252*m*, the read enable (RE) signal can be input as the data output control signal. Therefore, the data can be output to the DQ bus. The RE signal can be used to generate the data strobe signal DQS. Depending on the rising or falling edge of the write enable (WE) signal, the command and address signals can be locked in the page buffer.

The controller 4251 may control all operations of the storage device 4250. In one example embodiment, the controller 4251 may include a SRAM. The controller 4251 may write data to the NAND flash memory device 4252 in response to a write command or read data from the NAND flash memory device 4252 in response to a read command. For example, write commands and/or read commands may be provided from processor 4210 of storage server 4200, processor 4210*m* of another storage server 4200*m*, or processors 4110 and 4110*n* of application servers 4100 and 4100*n*. The DRAM 3253 may temporarily store (or buffer) data to be written to or read from the NAND flash memory device 4252. Also, DRAM 3253 can store metadata. Here, the metadata may be user data or data generated by the controller 4251 for managing the NAND flash memory device 4252. The storage device 4250 may include a security element (SE) for security or privacy.

Figure 13:
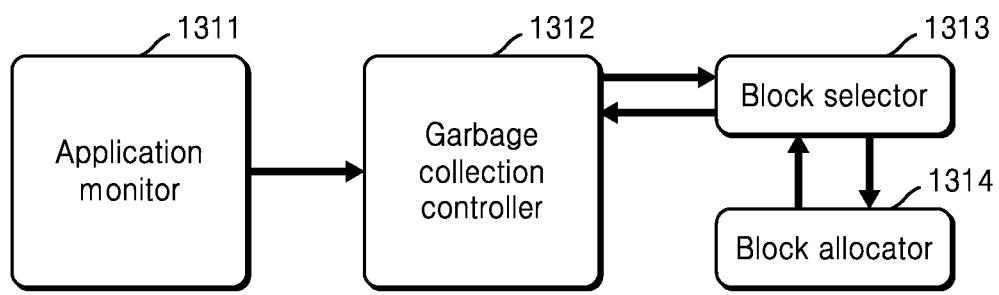
FIG. 13 shows a diagram of an overall architecture according to an example embodiment of the disclosure.

FIG. 13 shows a diagram of an overall architecture according to an example embodiment of the disclosure.

Referring to FIG. 13, the overall architecture of the disclosure may include an application monitor 1311 a garbage collection controller 1312, a block selector 1313 and a block allocator 1314.

According to an example embodiment, the application monitor 1311 may monitor operational parameters in an application of the database. Moreover, the application monitor 1311 may make statistics on the information of historical files, calculate an average lifetime of each level of files, and estimate the expiration time of files at the time of file creation by combining the acquired file level information with the average lifetime of historical files at that level and the creation time of new files.

According to an example embodiment, The garbage collection controller 1312 may estimate the busyness of the input/output of the database according to the operation parameters provided by the application monitor 1311 and decide whether to carry out garbage collection or not. For example, the garbage collection controller 1312 may execute the method described with reference to FIG. 2.

According to an example embodiment, the block selector 1313 may select a evicting block from a plurality of blocks. For example, the block selector 1313 may execute the method described with reference to at least one of FIGS. 3 and 4. In one example, the block selector 1313 may select a block with a small amount of valid data, a large amount of invalid data and a long remaining lifetime of valid data among the blocks as a evicting block for garbage collection.

According to an example embodiment, the block allocator 1314 may select a target block. For example, the block allocator 1314 may execute the method described with reference to at least one of FIGS. 5 and 6. In one example, the block allocator 1314 may select an appropriate target block for placement of valid data based on the expected expiration time of valid data in the evicting block and the expected expiration time and remaining available space of the target block.

Figure 14:
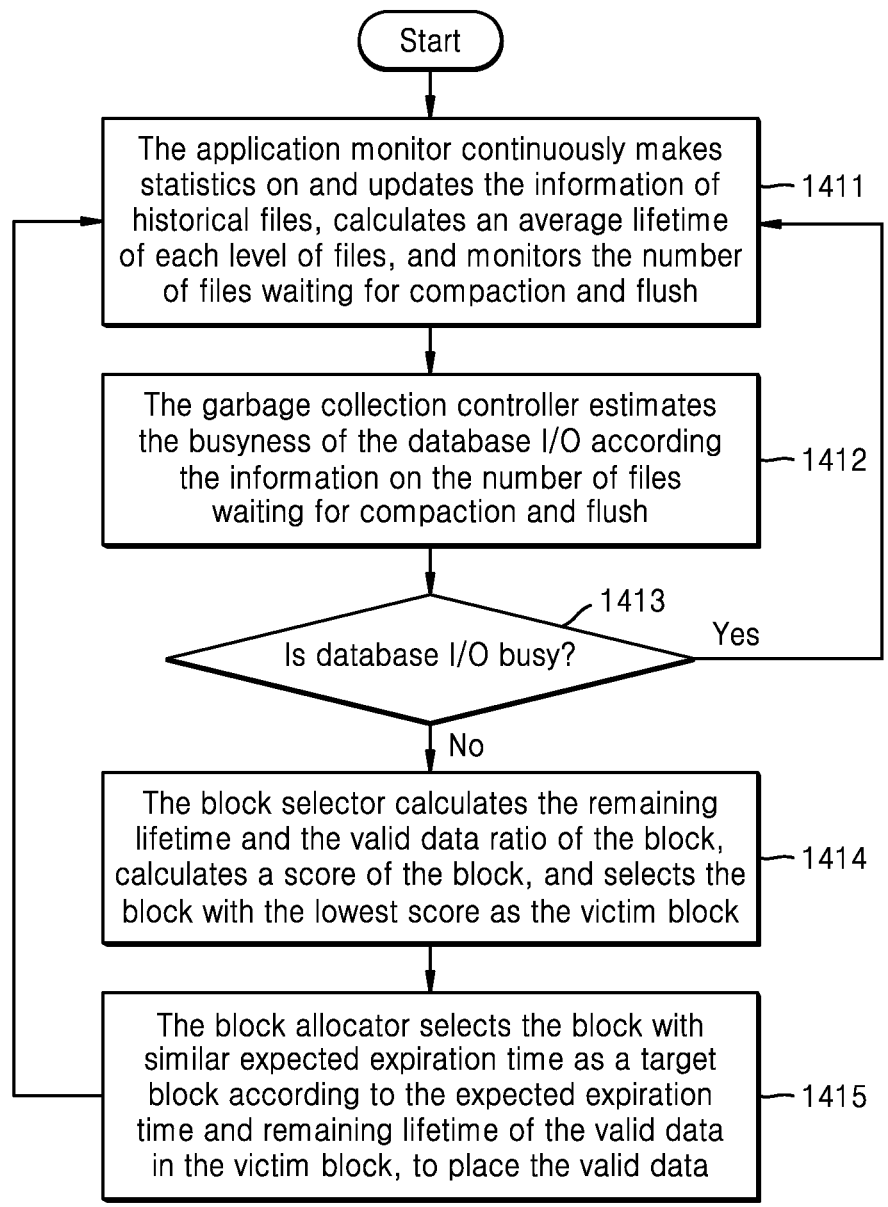
FIG. 14 shows a flowchart of a method of storing data according to an example embodiment of the disclosure.

FIG. 14 shows a flowchart of a method of storing data according to an example embodiment of the disclosure.

Referring to FIG. 14, in operation 51411, the application monitor may continuously make statistics on the information of historical files, calculate the average file lifetime of each level, and update the real lifetime and the expiration time of new files at the time of expiration of files. When a new file is created, the application monitor may obtain the creation time, size and level information of the new file, use the average lifetime of the file of that level as the lifetime of the new file according to the level information of the file, and estimate the expiration time of the new file, that is, the expiration time=creation time+lifetime. In addition, the application monitor may continuously monitor the number of files waiting for compaction and flushed in the database application, and these information will be used in the garbage collection controller. The number of files waiting for compaction can be obtained directly from a callback interface provided by the LSM-tree database, and the number of files waiting for flush can be expressed as the number of immutable-memtable files in the LSM-tree database.

In operation S1412, the garbage collection controller estimates the busyness of the database input/output based on information on the number of the compacted and flushed files. Statistical methods (such as weighted average method) or machine learning methods (such as logistic regression, SVR) can be used as estimation methods. For example, the weighted average method is used to select the historical average number of compacted and flushed files as the threshold. After weighting and calculating the current number of files, if it is greater than the threshold, the input/output (I/O) is considered busy and the garbage collection is not triggered; otherwise, the input/output (I/O) is considered not busy and the garbage collection is triggered.

In operation S1413, the garbage collection controller may determine whether the database input/output is busy. If it is determined that the input/output is busy, the garbage collection is not triggered; otherwise, if it is determined that the input/output is not busy, the garbage collection may be triggered.

In operation S1414, the block selector calculates the valid data ratio of the block according to the definition of the valid data ratio of the block, and calculates the score of the block in combination with the remaining lifetime information of the block. The block with the lowest score is selected as the evicting block for garbage collection. For example, the block selector may calculate the remaining lifetime of the block based on the definition of the remaining lifetime of the block and normalize it (for example, divide it by the maximum remaining lifetime of all blocks).

In operation S1415, the block allocator first calculates the expected expiration time of the block according to the definition of the expected expiration time of the block, then selects the block with similar expected expiration time of the valid data in combination with the remaining lifetime of the valid data, which can ensure that the data in the block will expire almost at the same time, thereby reducing the amount of valid data transit of the garbage collection, reducing the write amplification and greatly prolonging the service life of the storage device. If the blocks with similar expected expiration time exist, a block with the smallest remaining space and capable of accommodating valid data is selected from these blocks to place valid data, and if the blocks with similar expected expiration time do not exist, a block with the closest expected expiration time and capable of accommodating the valid data is selected to place valid data.

According to the method of storing data of an example embodiment of the disclosure, it is possible to select a evicting block or a target block from a plurality of blocks in consideration of an expected expiration time of each block obtained based on an expected expiration time of valid data of each block, so that an appropriate evicting block and/or a target block may be selected, thereby performing garbage collection more efficiently, reducing write magnification, and greatly prolonging the service life of a storage apparatus.

According to the method of storing data of an example embodiment of the disclosure, a block having a relatively large expected expiration time can be selected from a plurality of blocks as a evicting block, and thus when garbage collection is performed on the block having a relatively large expected expiration time as the evicting block, the number of transits of valid data in the block and the overhead of garbage collection can be reduced, write magnification can be reduced, and the service life of a storage apparatus can be greatly improved.

According to the method of storing data of an example embodiment of the disclosure, garbage collection cannot be blindly executed, but the garbage collection is executed on at least one block when the input/output of the database is determined to be not busy, so that the influence on the bandwidth of a device for storing data when garbage collection is executed can be reduced, and the performance of the device for storing data can be remarkably improved.

According to the method of storing data of an example embodiment of the disclosure, the storage device can be automatically optimized to reduce garbage collection overhead, thereby reducing write amplification and improving the performance and service life of the storage device. In addition, according to the method of storing data of an example embodiment of the disclosure, it is possible to improve the maximum utilization of the storage device, where the maximum utilization is defined as a ratio of a valid data capacity in the storage apparatus to a capacity of the entire storage apparatus when the LSM-tree database data cannot be written.

The method of storing data according to an example embodiment of the disclosure may occupy very little computing and storage resources and therefore is easy to be implemented.

According to the method of storing data of an example embodiment of the disclosure, since a block attribute including at least one of an amount of valid data of a block, an amount of invalid data of a block and a valid data ratio of a block and an expected expiration time of a block can be taken into account to select a evicting block, a processor can select an appropriate evicting block, thereby executing garbage collection more effectively, reducing write magnification, and greatly prolonging the service life of the storage apparatus.

According to the method of storing data of an example embodiment of the disclosure, since an expected expiration time of valid data of the evicting block and an expected expiration time of other blocks in the plurality of blocks can be taken into account to select the target block, a processor can select an appropriate target block for valid data to be evicted, thereby executing garbage collection more efficiently, reducing write magnification, and greatly prolonging the service life of the storage apparatus.

According to the method of storing data of an example embodiment of the disclosure, valid data of a evicting block may be preferentially placed in a block with a similar expected expiration time (i.e., a difference between the expected expiration time of the valid data of the evicting block and the expected expiration time of the selected target block being less than or equal to a preset value). Since the valid data to be transited in the evicting block can be placed in the block with similar expected expiration time, the overhead of garbage collection can be reduced, thereby reducing write amplification, and improving the performance and service life of the storage apparatus.

According to the method of storing data of an example embodiment of the disclosure, when the number of target blocks satisfying a preset condition is plural, a processor may preferentially place valid data in a evicting block in a block with less remaining available space and capable of accommodating the valid data in the evicting block. Therefore, the processor can erase more invalid data in one garbage collection operation, thereby improving garbage collection performance.

According to one or more example embodiments, the above-described processor may be implemented using a combination of hardware, hardware, and software, or a non-transitory storage medium storing executable software for performing its functions.

Hardware may be implemented using processing circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, etc., capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., one or more processors, CPUs, controllers, ALUs, DSPs, microcomputers, microprocessors, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor. In another example, the hardware device may be an integrated circuit customized into special purpose processing circuitry (e.g., an ASIC).

A hardware device, such as a computer processing device, may run an operating system (OS) and one or more software applications that run on the OS. The computer processing device also may access, store, manipulate, process, and create data in response to execution of the software. For simplicity, one or more example embodiment may be exemplified as one computer processing device; however, those skilled in the art will appreciate that a hardware device may include multiple processing elements and multiple types of processing elements. For example, a hardware device may include multiple processors or a processor and a controller. In addition, other processing configurations are possible, such as parallel processors.

Software and/or data may be embodied permanently or temporarily in any type of storage media including, but not limited to, any machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer-readable recording media, including tangible or non-transitory computer-readable storage media as discussed herein.

For example, according to example embodiments of the present disclosure, provided is a computer-readable storage medium storing a computer program, which, when executed by a processor, implements a method of storing data at least including: determining whether input/output of a database is busy; and executing garbage collection by using a evicting block and a target block from among the plurality of blocks in response to determining that the input/output of the database is not busy. Further, other methods of the disclosure may similarly be implemented by a computer-readable storage medium storing a computer program.

Storage media may also include one or more storage devices at units and/or devices according to one or more example embodiment. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store computer programs, program code, instructions, or some combination thereof, for one or more operating systems and/or for implementing the example embodiment described herein. The computer programs, program code, instructions, or some combination thereof, may also be loaded from a separate computer-readable storage medium into the one or more storage devices and/or one or more computer processing devices using a drive mechanism. Such a separate computer-readable storage medium may include an Universal Serial Bus (USB) flash drive, a memory stick, a Blu-ray/DVD/CD-ROM drive, a memory card, and/or other like computer-readable storage media. The computer programs, program code, instructions, or some combination thereof, may be loaded into the one or more storage devices and/or the one or more computer processing devices from a remote data storage device via a network interface, rather than via a computer-readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the storage media, the computer programs, program code, instructions, or some combination thereof, may be specially designed and constructed for the purposes of the example embodiment, or they may be known devices that are altered and/or modified for the purposes of example embodiment.

The foregoing is illustrative of example embodiment and is not to be construed as limiting thereof. Although a few example embodiment have been described, those skilled in the art will readily appreciate that many modifications are possible in the example embodiment without materially departing from the novel teachings and advantages of example embodiment of the inventive concepts. Accordingly, all such modifications are intended to be included within the scope of example embodiment of the inventive concepts as defined in the claims. Therefore, it is to be understood that the foregoing is illustrative of various example embodiment and is not to be construed as limited to the specific example embodiment disclosed, and that modifications to the disclosed example embodiment, as well as other example embodiment, are intended to be included within the scope of the appended claims.

What is claimed is:

1. A method of storing data, the method comprising:
obtaining a score for each of a plurality of blocks based on a block attribute and an expected expiration time of a respective block among the plurality of blocks;
selecting, based on a request for garbage collection, at least one first block from a plurality of blocks in a storage as an evicting block or a target block based on the score of each of the plurality of blocks, the expected expiration time of each of the plurality of blocks being obtained based on an expected expiration time of valid data of each of the plurality of blocks; and
performing garbage collection based on the selected at least one first block.

2. The method according to claim 1, wherein the selecting the at least one first block as the evicting block or the target block comprises:
selecting the at least one first block from the plurality of blocks in the storage as the evicting block,
wherein the expected expiration time of the selected evicting block is greater than or equal to expected expiration times of one or more second blocks, other than the evicting block, in the plurality of blocks.

3. The method according to claim 2, further comprises:
selecting at least one second block satisfying a condition from among the one or more second blocks as the target block based on an expected expiration time of the valid data of the evicting block and expected expiration times of the one or more second blocks in the block.

4. The method according to claim 3, wherein the condition comprises:
a difference between the expected expiration time of the valid data of the evicting block and the expected expiration time of the target block being less than or equal to a reference value.

5. The method according to claim 1, wherein the selecting the at least one first block from the plurality of blocks as the evicting block comprises:
selecting the at least one first block from the plurality of blocks as the evicting block based on the expected expiration time and at least one of an amount of invalid data, an amount of valid data or a valid data ratio of each of the plurality of blocks,
wherein the valid data ratio of each block indicates a ratio between the amount of valid data for the block and a total amount of data in the plurality of blocks.

6. The method according to claim 1, wherein the expected expiration time of each block is an average of the expected expiration times of the valid data of each of the plurality of blocks.

7. The method according to claim 1, wherein the data of each of the plurality of blocks is data of a data file of a log structure merge tree (LSM-Tree) database, and wherein the expected expiration time of the valid data of each block is obtained according to an expected expiration time of the data file to which the valid data belongs.

8. The method according to claim 7, wherein the method further comprises:
obtaining operating parameters of the LSM-Tree database, the operating parameters comprising at least one of a number of files waiting for compaction compacted, a number of files being compacted, a number of files waiting for flush, or a number of files being flushed in the LSM-Tree database;
determining whether input or output of the LSM-Tree database is busy using a pre-trained machine learning model with the operating parameters as inputs; and
generating the request for garbage collection when the input or output of the LSM-Tree database is not busy.

9. A non-transitory computer-readable storage medium storing a computer program, which, when executed by a processor, implements the method of storing data according to claim 1.

10. A device for storing data, the device comprising:
a storage divided into a plurality of blocks for storing data; and
a processor configured to:
obtaining a score for each of the plurality of blocks based on a block attribute and an expected expiration time of a respective block among the plurality of blocks;
select, based on a request for garbage collection, at least one first block from a plurality of blocks in a storage as an evicting block or a target block based on the score of each of the plurality of blocks, the expected expiration time of each of the plurality of blocks being obtained based on an expected expiration time of valid data of each of the plurality of blocks; and
perform garbage collection based on the selected at least one first block.

11. The device according to claim 10, wherein the processor selects the at least one first block from the plurality of blocks in the storage as the evicting block, and
wherein the expected expiration time of the selected evicting block is greater than or equal to expected expiration times of one or more second blocks, other than the evicting block, in the plurality of blocks.

12. The device according to claim 11, wherein the processor is configured to:
select at least one second block satisfying a condition from among the one or more second blocks as the target block based on an expected expiration time of the valid data of the evicting block and expected expiration times of the one or more second blocks in the plurality of blocks.

13. The device according to claim 12, wherein the condition comprises:
a difference between the expected expiration time of the valid data of the evicting block and the expected expiration time of the selected target block being less than or equal to a preset value.

14. The device according to claim 10, wherein the processor is configured to:
select the at least one first block from the plurality of blocks as the evicting block based on the expected expiration time and at least one of an amount of invalid data, an amount of valid data or a valid data ratio of each of the plurality of blocks, wherein the valid data ratio of each block indicates a ratio between the amount of valid data for the block and a total amount of data in the block.

15. The device according to claim 10, wherein the expected expiration time of each block is an average of the expected expiration times of the valid data of each of the plurality of blocks.

16. The device according to claim 10, wherein the data of each of the plurality of blocks is data of a data file of a log structure merge tree (LSM-Tree) database, and
wherein the expected expiration time of the valid data of each block is obtained according to an expected expiration time of the data file to which the valid data belongs.

17. The device according to claim 16, wherein the processor is further configured to:
obtain operating parameters of the LSM-Tree database, the operating parameters comprising at least one of a number of files waiting for compaction compacted, a number of files being compacted, a number of files waiting for flush, or a number of files being flushed in the LSM-Tree database;
determine whether input or output of the LSM-Tree database is busy using a pre-trained machine learning model with the operating parameters as inputs; and
generate the request for garbage collection when the input or output of the LSM-Tree database is not busy.

18. An electronic system, the electronic system comprises:
a memory storing one or more instructions; and
a storage device divided into a plurality of blocks for storing data; and
a processor configured to execute the one or more instructions to:
obtain a score for each of the plurality of blocks based on a block attribute and an expected expiration time of a respective block among the plurality of blocks;
select, based on a request for garbage collection, at least one first block from the plurality of blocks in the storage device as an evicting block or a target block based on the score of each of the plurality of blocks, the expected expiration time of each of the plurality of blocks being obtained based on an expected expiration time of valid data of each of the plurality of blocks; and
perform garbage collection based on the selected at least one first block.

* * * * *